US011044376B2

(12) United States Patent
Utsumi

(10) Patent No.: US 11,044,376 B2
(45) Date of Patent: Jun. 22, 2021

(54) INFORMATION PROCESSING SYSTEM, METHOD FOR CONTROLLING INFORMATION PROCESSING SYSTEM, MANAGEMENT SERVER, METHOD FOR CONTROLLING MANAGEMENT SERVER, AND NON-TRANSITORY STORAGE

(71) Applicant: CANON KABUSHIKI KAISHA, Tokyo (JP)

(72) Inventor: Keiko Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/814,269

(22) Filed: Mar. 10, 2020

(65) Prior Publication Data
US 2020/0296228 A1 Sep. 17, 2020

(30) Foreign Application Priority Data

Mar. 15, 2019 (JP) .............................. JP2019-048749

(51) Int. Cl.
*H04N 1/00* (2006.01)
*G06F 3/12* (2006.01)

(52) U.S. Cl.
CPC ........... *H04N 1/0097* (2013.01); *G06F 3/123* (2013.01); *G06F 3/1224* (2013.01); *G06F 3/1288* (2013.01); *H04N 1/00973* (2013.01); *H04N 2201/0094* (2013.01)

(58) Field of Classification Search
None
See application file for complete search history.

(56) References Cited

U.S. PATENT DOCUMENTS

| 2012/0154840 | A1* | 6/2012 | Kikuchi | H04N 1/00344 |
| | | | | 358/1.13 |
| 2012/0195603 | A1* | 8/2012 | Nakata | G03G 15/5075 |
| | | | | 399/8 |
| 2015/0264198 | A1* | 9/2015 | Kamiya | H04N 1/32122 |
| | | | | 358/1.13 |
| 2016/0231971 | A1* | 8/2016 | Sato | H04N 1/00204 |
| 2019/0129658 | A1* | 5/2019 | Matsuda | G06F 3/123 |

FOREIGN PATENT DOCUMENTS

| JP | 2016-148947 A | 8/2016 |
| JP | S161314 B2 | 7/2017 |

* cited by examiner

*Primary Examiner* — Miya J Williams
(74) *Attorney, Agent, or Firm* — Canon U.S.A., Inc., IP Division

(57) ABSTRACT

A management server includes a generation unit configured to generate a second script for executing transmission processing of data from an image processing apparatus to another image processing apparatus, and for transmitting by the image processing apparatus an execution result of the transmission processing to the management server. The management server is configured to, when the image processing apparatus starts setting processing, generate the second script and transmit a first script and the second script to a client.

15 Claims, 19 Drawing Sheets

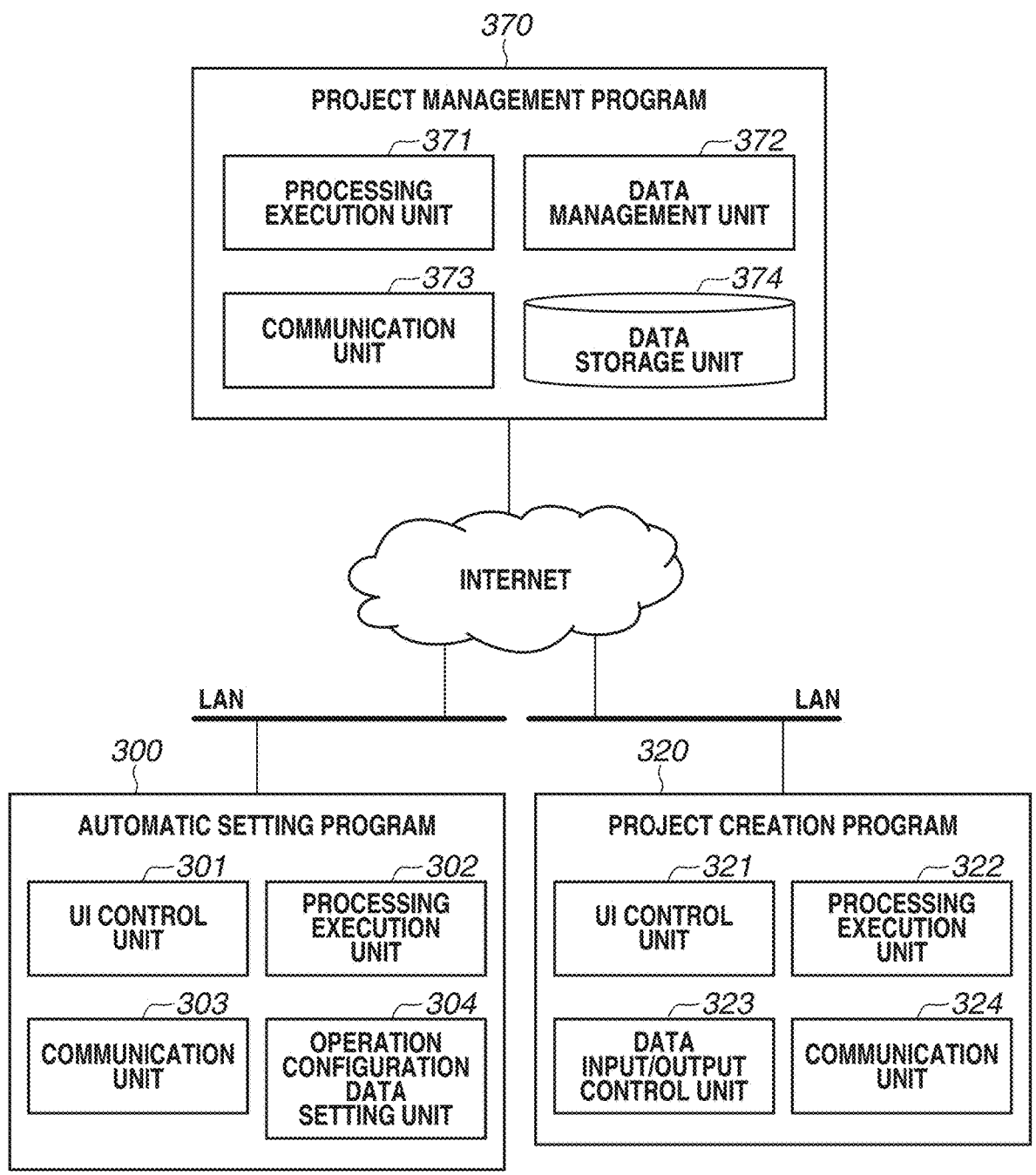

FIG.4A

| PROJECT ID (401) | PROJECT NAME (402) | DEADLINE (403) |
|---|---|---|
| A001 | Project A1 | 2020/12/31 |
| B002 | Project B2 | ... |
| ... | ... | ... |

FIG.4B

| SETTING ID (411) | DEVICE NAME (412) | PROJECT ID (413) | IP ADDRESS (414) | SMB SERVER (415) | FW SERVER (416) | SETTING SCRIPT (417) | SETTING RESULT (418) |
|---|---|---|---|---|---|---|---|
| S001 | MFP110 | A001 | 172.24.1.1 | OFF | 111.222.333.444 | set_S001.xml | OK |
| S002 | MFP111 | A001 | 172.24.1.2 | ON | 111.222.333.444 | set_S002.xml | — |
| S003 | MFP112 | A001 | 172.29.1.1 | ON | 111.222.333.444 | set_S003.xml | — |
| S004 | MFP113 | A001 | 172.29.1.2 | OFF | 111.222.333.444 | set_S004.xml | — |
| S005 | COPYING MACHINE B | B002 | 192.168.X.X | ... | ... | ... | — |
| ... | ... | ... | ... | ... | ... | ... | — |

FIG.4C

| FOLDER ID (421) | SETTING ID (422) | PARENT FOLDER ID (423) | FOLDER NAME (424) |
|---|---|---|---|
| F0001 | S002 | — | reception_data_X |
| F0002 | S002 | — | transmission_data_1 |
| F0003 | S002 | F0002 | from_office_Y |
| F0004 | S002 | F0002 | from_office_Z |
| F0005 | S003 | — | reception_data_Y |
| F0006 | S003 | — | transmission_data_2 |
| F0007 | S003 | F0006 | from_office_X |
| ... | ... | ... | ... |

FIG.4D

| TRANSMISSION ID (431) | SETTING ID (432) | TRANSMISSION CONDITION (433) | FOLDER ID (434) |
|---|---|---|---|
| W001 | S001 | title="X" | F0001 |
| W002 | S001 | title="Y" | F0007 |
| W003 | S003 | title="X" | F0003 |
| W004 | S003 | title="Y" | F0005 |
| W005 | ... | ... | ... |

FIG.4E

| SETTING ID (441) | CHECKING SCRIPT (442) | CHECK RESULT (443) |
|---|---|---|
| S001 | check0001.xml | — |
| S002 | check0002.xml | — |
| S003 | check0003.xml | — |
| ... | ... | ... |

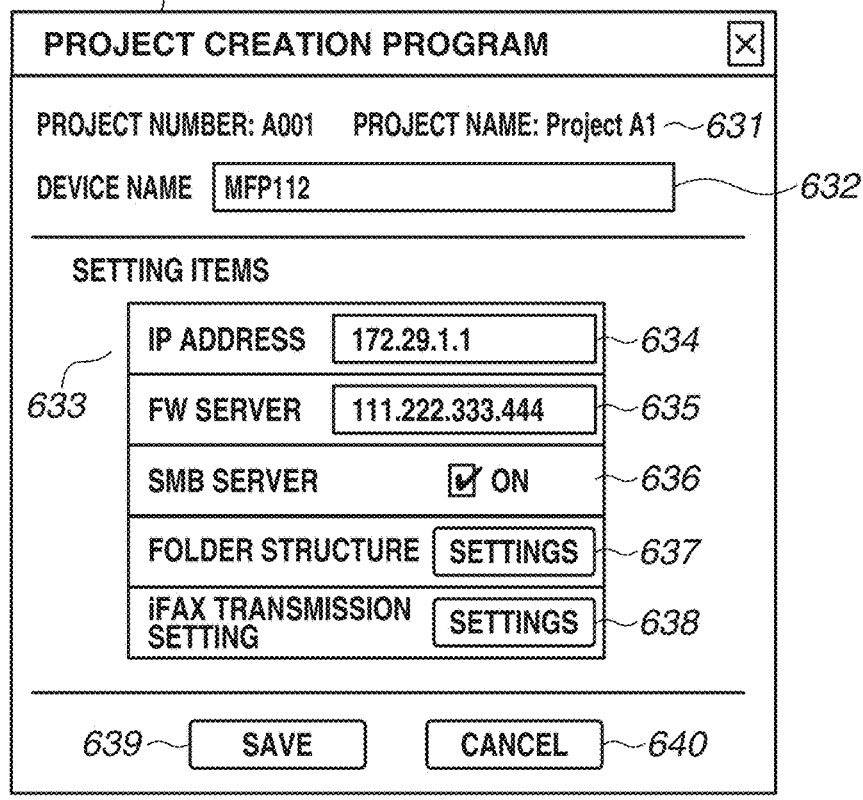
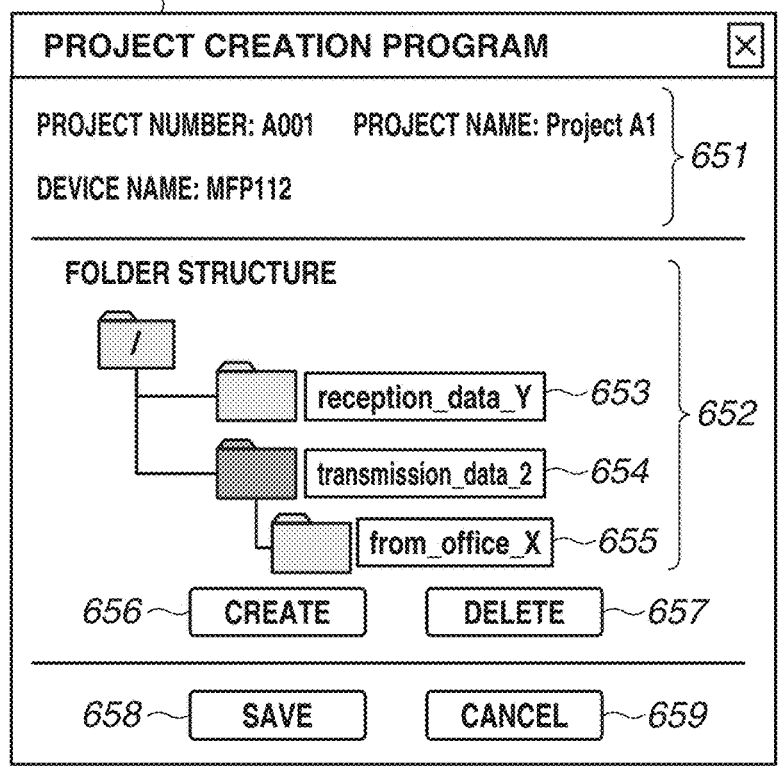

FIG.6E

PROJECT CREATION PROGRAM

PROJECT NUMBER: A001    PROJECT NAME: Project A1
DEVICE NAME: MFP112

TRANSMISSION CONDITIONS

| ☐ title | X | TRANSMISSION DESTINATION SETTING |
| ☐ title | Y | TRANSMISSION DESTINATION SETTING |

ADD    DELETE

SAVE    CANCEL

FIG.6F

PROJECT CREATION PROGRAM

PROJECT NUMBER: A001    PROJECT NAME: Project A1
DEVICE NAME: MFP112

TRANSMISSION DESTINATION SETTINGS:
TRANSMISSION CONDITIONS (title="X")

DEVICE NAME: MFP111  [−] /
├── reception_data_X
├── transmission_data_1
│   ├── from_office_Y
│   └── from_office_Z

DEVICE NAME: MFP112  [+] /

SET    CANCEL

FIG.7A

```
<settingScript> ~700
    <id>S003</id> ~701
    <values>
        <deviceName>MFP112</deviceName> ~710
        <ipAddress>172.29.1.1</ipAddress> ~711
        <smbServer>ON</smbServer> ~712
        <fwServer>111.222.333.444</fwServer> ~713
        <folders>
            <folder id="F0005" parent="none">
                <name>reception_data_Y</name>
            </folder>
            <folder id="F0006" parent="none">
                <name>transmission_data_2</name>
            </folder>
            <folder id="F0007" parent="F0005">
                <name>from_office_X</name>
            </folder>
        </folder>
        <forward protocol="smb"> ~722
            <condition> ~723
                <title>"X"</title>
            </condition>
            <device> ~724
                <name>MFP111</name>
                <ipAddress>172.24.1.2</ipAddress>
            </device>
            <path>/transmission_data_1/from_office_Y</path>
        </forward>
        <forward protocol="local">
            <condition>
                <title>"Y"</title>
            </condition>
            <path>/reception_data_Y/</path>
        </forward>
        . . .
    </values>
</settingScript>
```

FIG.7B

| OPERATION SETTING ITEM | OPERATION SETTING VALUE |
|---|---|
| DEVICE NAME | MFP112 |
| IP ADDRESS | 172.29.1.1 |
| SMB SERVER | ON |
| FW SERVER | 111.222.333.444 |
| TRANSMISSION CONDITION 1 | title="X" |
| TRANSMISSION PROTOCOL 1 | SMB |
| TRANSMISSION DESTINATION 1 | //172.24.1.2/transmission_data_1/from_office_Y |
| TRANSMISSION CONDITION 2 | title="Y" |
| TRANSMISSION PROTOCOL 2 | local |
| TRANSMISSION DESTINATION 2 | /reception_data_Y/ |
| FUNCTION | iFAX |
| . . . | . . . |

FIG.8

```
<checkingScript>                                    800
        <id>S003</id>                               801
        <retry>
                <interval>day</interval>                    810
                <limited>2020/12/31 00:00</limited>
        </retry>
        <client>
                <destination protocol="ping">               820
                        <ip>111.222.333.444</ip>    821
                </destination>
                <destination protocol="smb">
                        <deviceName>MFP111</deviceName>     822
                        <ip>172.24.1.2</ip>
                        <path>/transmission_data_1/from_office_Y</path>
                </destination>
        </client>
        <server>
                <source>                                    830
                        <deviceMame>MFP110</deviceName>     831
                        <ip>172.24.1.1</ip>
                        <path>/transmission_data_2/from_office_X</path>
                </source>
        </server>
</checkingScript>
```

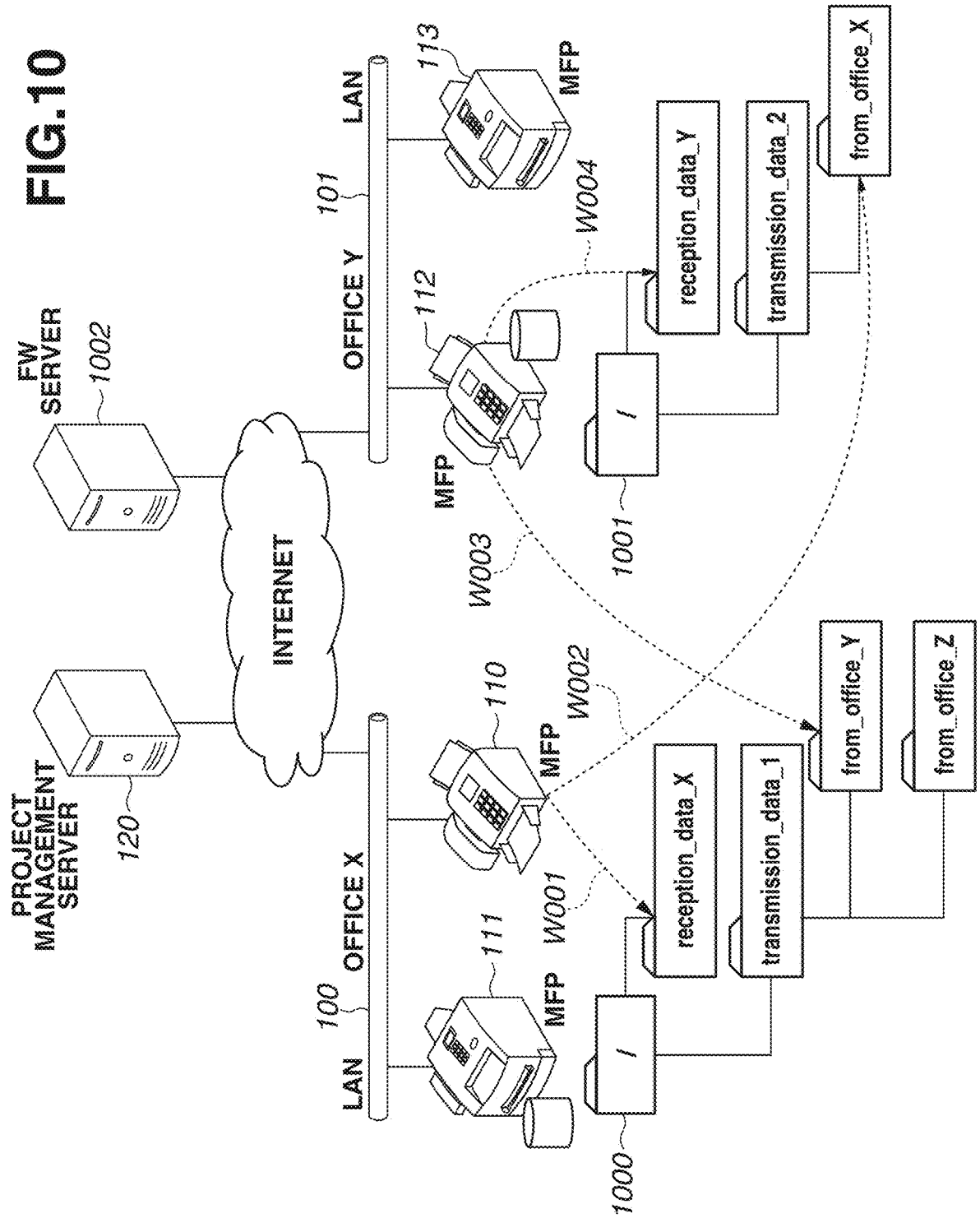

```
<?xml version="1.0" encoding="utf-8" ?>
<script xmlns:xsi="http://www.XXX.com/XMLSchema">
    <!-- SETTING INFORMATION -->
    <installationDataId>MDL004</installDataId>
    <deviceId>D111</deviceId>

<!-- SETTING PROCESSING GROUP -->
    <commands>
        <!-- FW UPDATE PROCESSING -->
        <updateFirmwareCommand order="1">
            <dirpath>firmware</dirpath>
            <name>firm_A_V2001.zip</name>
        </updateFirmwareCommand>

<!-- OPTIONAL FUNCTION ACTIVATION PROCESSING -->
        <activateOptionCommand order="2">
            <dirpath>opts</dirpath>
            <name>opt_qrcode.lic</name>
        </activateOptionCommand>

<!--EXPANSION PROGRAM INSTALLATION PROCESSING -->
        <installApplicationCommand order="3">
            <dirpath>apps</dirpath>
            <name>application01.jar</name>
            <name>licence.lic</name>
        </installApplicationCommand>

<settingCommand order="5">
            FIG. 7A
        <settingCommand>
    </commands>
</script>
```

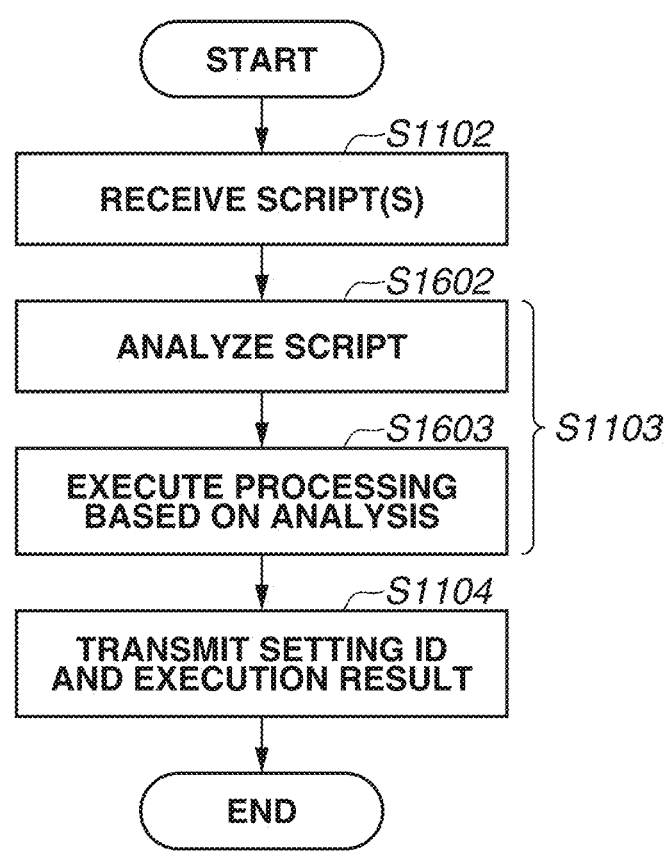

INFORMATION PROCESSING SYSTEM, METHOD FOR CONTROLLING INFORMATION PROCESSING SYSTEM, MANAGEMENT SERVER, METHOD FOR CONTROLLING MANAGEMENT SERVER, AND NON-TRANSITORY STORAGE

BACKGROUND

Field

The present disclosure relates to an information processing system for executing setting processing on an image processing apparatus, and a method for controlling the same.

Description of the Related Art

When new customizable devices, typified by image processing apparatuses such as a multifunction peripheral (MFP), are installed in a customer environment, setting processing based on the customer environment is typically performed. In performing setting processing on a plurality of devices, software and setting information to be used, data such as verification data, and scripts describing the procedure of the setting processing using the data needs to be generated in advance.

Japanese Patent No. 6161314 discusses a system that efficiently executes setting processing based on such scripts. Japanese Patent Application Laid-Open No. 2016-148947A discusses a system where setting results of setting processing are automatically transmitted from MFPs to a project management server for management.

SUMMARY

According to an aspect of the present disclosure, an information processing system includes a plurality of image processing apparatuses, a client configured to generate a first script including a procedure of setting processing for installing setting data including at least either an application for implementing a function of one of the plurality of image processing apparatuses or firmware for operating the application, and a management server configured to manage the first script, wherein the management server includes a generation unit configured to generate a second script for executing transmission processing of data from the image processing apparatus to another image processing apparatus, and for transmitting by the image processing apparatus an execution result of the transmission processing to the management server, and wherein the management server is configured to, when the image processing apparatus starts the setting processing, generate the second script using the generation unit and transmit the first and second scripts to the client.

Further features of the present disclosure will become apparent from the following description of exemplary embodiments with reference to the attached drawings.

BRIEF DESCRIPTION OF THE DRAWINGS

FIG. 3 is a block diagram illustrating a software configuration of the system.

FIGS. 4A, 4B, 4C, 4D, and 4E are charts illustrating data tables managed by a data storage unit.

FIGS. 6A, 6B, 6C, 6D, 6E, and 6F are diagrams illustrating user interface (UI) screens displayed by a project creation program.

FIGS. 7A and 7B are diagrams illustrating an example of a setting script and operation configuration data.

FIG. 8 is a diagram illustrating an example of a checking script.

FIG. 10 is a diagram illustrating a system configuration in Project Al.

FIG. 15 illustrates an example of a script for executing setting processing by an MFP.

FIG. 16 is a flowchart illustrating the setting processing by the MFP.

DESCRIPTION OF THE EMBODIMENTS

Figure 1:
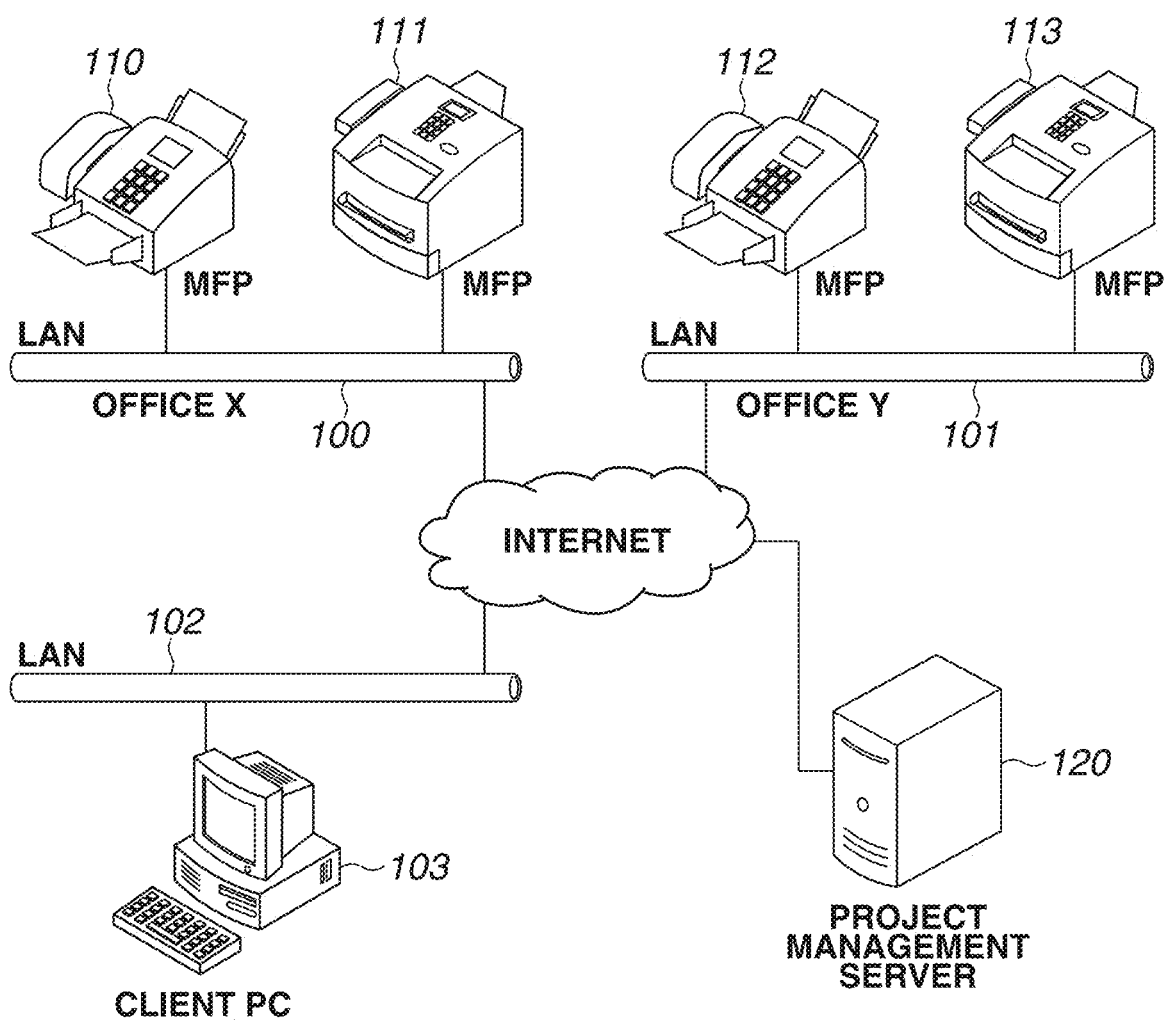
FIG. 1 is a diagram illustrating a configuration of a system to which an information processing apparatus is applied.

A big business deal often includes delivering a plurality of multifunction peripherals (MFPs) to an environment across a plurality of offices or departments and making settings including system configuration with a plurality of MFPs. Examples of the system configuration include where a document server and a plurality client MFPs are installed in each department, and where MFPs are configured to automatically transmit reception data such as facsimile (FAX) data and Internet FAX (iFAX) data to a specific MFP.

To deliver the foregoing system, processing such as installation of firmware and applications is often performed in advance on each MFP in an environment different from the customer environment (such as a plant and a warehouse). Transmission settings for transmitting data to the specific MFP are also made in the process. Whether the data transmission settings are successfully made is checked after the MFPs with functions made usable are delivered to the customer.

Japanese Patent No. 6161314 and Japanese Patent No. 2016-148947A can be combined to provide a configuration where setting results of the setting processing, including those of the transmission settings, and check results indicating whether the transmission settings have been successfully made are transmitted to a server. There is a demand to manage the results by location where the processing is executed. In other words, separate management of the setting results and the check results is demanded.

To separately manage the two types of results, a script for executing the setting processing on each MFP and transmitting the setting result to the server and a script for checking the transmission settings and transmitting the check result to the server may desirably be prepared separately. Preparing a plurality of scripts, however, leads to increased burden on a project creator who generates the scripts. In addition, changing the setting contents of the transmission settings involves modifying both the scripts.

An exemplary embodiment of the features providing a system that executes setting processing on a plurality of MFPs and transmits the setting results to a server, checks transmission settings between the MFPs, and transmits the check results to the server.

According to the present exemplary embodiment, a system that performs setting processing on a plurality of MFPs and transmits the setting results to a server, checks transmission settings between the MFPs, and transmits the check results to the server can be provided.

Exemplary embodiments of the present disclosure will be described below with reference to the drawings. First, definitions of terms used in a first exemplary embodiment will be described.

Operation configuration data refers to operation setting items and operation setting values set for the operation setting items. The operation setting items refer to items for switching operation of an MFP. Examples of the operation setting values include an Internet Protocol (IP) address of the MFP, a setting value indicating whether the MFP serves as a Server Message Block (SMB) server, and a transmission condition and a transmission destination of reception data. The operation of an MFP can be switched to a desired operation by setting operation setting values for operation setting items. The operation setting values are set for the operation setting items by the MFP executing a setting script to be described below.

<Configuration of Information Processing System>

FIG. 1 illustrates an example of a configuration of an information processing system according to the present exemplary embodiment. Local area networks (LANs) 100 and 101 are LANs in customer environments where settings are to be made. A plurality of MFPs 110 to 113 is connected to the LANs 100 and 101. The MFPs 110 to 113 are image processing apparatuses each configured by integrating a plurality of functions, such as a scanner function and a printer function, into a copying machine. An automatic setting program 300 to be described below is installed on each of the MFPs 110 to 113. The MFPs 110 to 113 can obtain a setting script (FIG. 7A) managed by a project management server 120 and an automatically-generated checking script (FIG. 8) by executing the automatic setting program 300. The automatic setting program 300 also has a function of executing automatic setting processing based on the contents of the setting script and a function of automatically checking a system configuration based on the checking script.

A LAN 102 is a LAN in an environment where advance preparations such as generation of the setting script are performed. A client personal computer (PC) 103 is connected to the LAN 102. The client PC 103 is an information processing apparatus, on which a project creation program 320 is installed. The project creation program 320 is a program for generating project data such as a setting script.

The project management server 120 is a server on which a project management program 370 is installed. The project management program 370 is a program for managing the project data generated by the client PC 103. In the present exemplary embodiment, the MFPs 110 to 113 are described as examples of the image processing apparatus. It will be understood that PCs and single function printers (SFPs) may also be used as image processing apparatuses.

<Hardware Configuration of MFP>

Figure 2A:
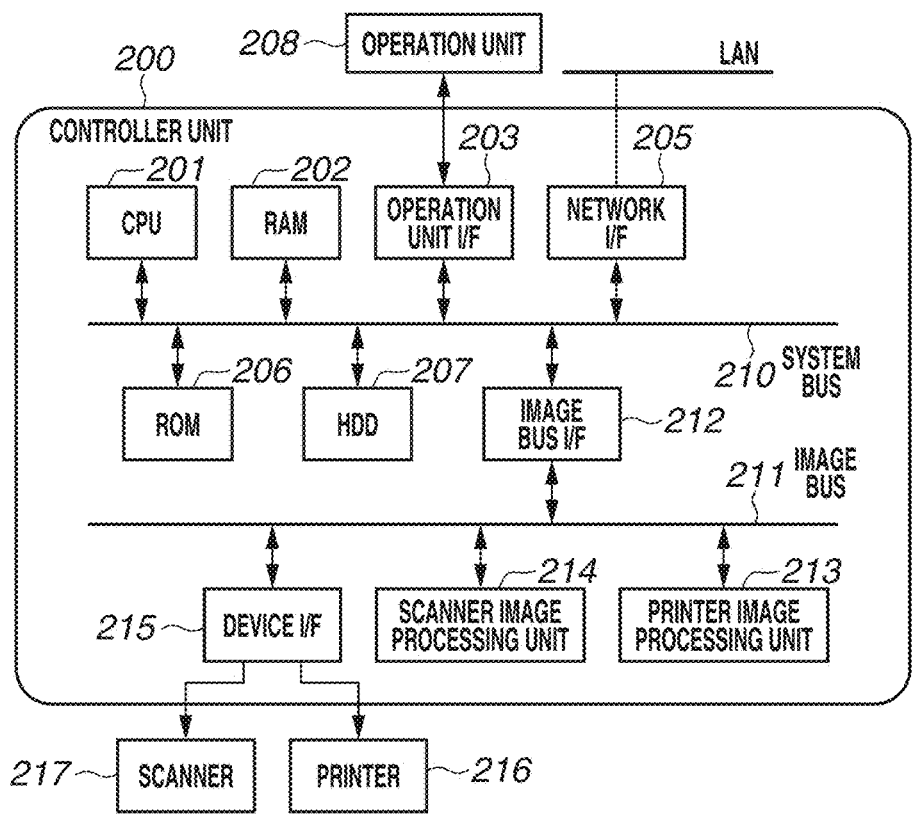
FIGS. 2A, 2B, and 2C are block diagrams illustrating a hardware configuration of the system.
Figure 2B:
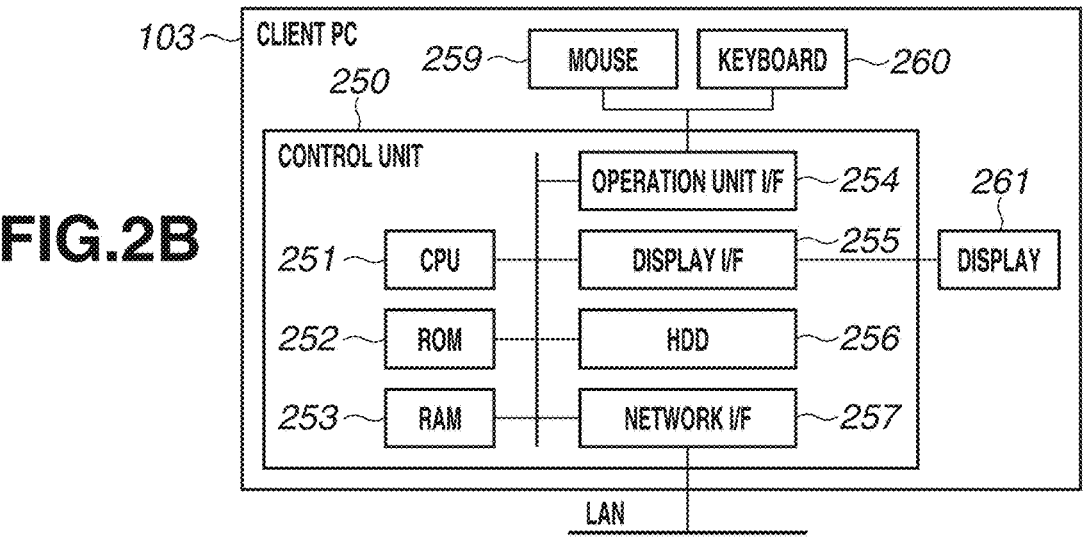
Figure 2C:
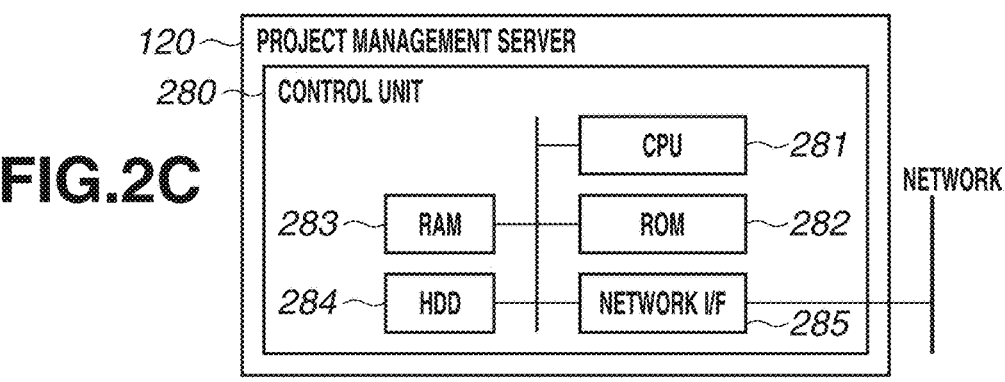

FIGS. 2A, 2B, and 2C are block diagrams illustrating an example of a hardware configuration of the information processing system illustrated in FIG. 1. FIG. 2A illustrates an example of a hardware configuration of an MFP. The MFP includes a controller unit 200. A scanner 217 which is an image input device, a printer 216 which is an image output device, and an operation unit 208 are connected to the controller unit 200. The controller unit 200 controls implementation of a copy function for printing and outputting image data read by the scanner 271 with the printer 216.

The controller unit 200 includes a central processing unit (CPU) 201, which is a processor. The CPU 201 starts up an operating system (OS) by using a boot program stored in a read-only memory (ROM) 206. The CPU 201 runs programs stored in a hard disk drive (HDD) 207 on the OS and performs various processes by using a random access memory (RAM) 202 as a work area. The HDD 207 can store various types of data and operation configuration data, and can construct a folder structure based on user settings.

An operation unit interface (I/F) 203, a network I/F 205, and an image bus I/F 212 are connected to the CPU 201 via a system bus 210. The operation I/F 203 is an I/F with the operation unit 208 including a touch panel. The operation I/F 203 outputs image data to be displayed on the operation unit 208, and transmits information input from the operation unit 208 by the user to the CPU 201. The network I/F 205 is an I/F for connecting the MFP to an LAN, and transmits and receives data to/from outside. For example, Internet facsimile (iFAX) transmission is facsimile (FAX) transmission processing performed via the network I/F 205. The MFP also transmits and receives data to/from outside via the network I/F 205 in using an SMB server or a client function.

The image bus I/F 212 is a bus bridge for connecting the system bus 210 to an image bus 211 that transmits image data at high speed, and converting data formats. A device I/F 215, a scanner image processing unit 214, and a printer image processing unit 213 are located on the image bus 211. The device I/F 215 is connected with the scanner 217 and the printer 216, and converts image data between synchronous and asynchronous systems. The scanner image processing unit 214 edits input image data. The printer image processing unit 213 performs resolution conversion on print output image data.

<Hardware Configuration of Client PC 103>

FIG. 2B illustrates an example of a hardware configuration of the client PC 103. A control unit 250 including a CPU 251 controls operation of the entire client PC 103. The CPU 251 reads a control program stored in a ROM 252 and performs various types of control processing. A RAM 253 is used as a temporary storage area such as a main memory and a work area of the CPU 251. An HDD 256 stores various types of data and programs. An operation unit I/F 254 establishes connection with a user interface terminal for inputting control operations to the programs executed by the client PC 103. In the present exemplary embodiment, the user interface terminal includes a mouse 259 and a keyboard 260. However, this is not restrictive. A display I/F 255 is connected with a display terminal of the client PC 103, and displays a user interface (UI) implemented by a program of the client PC 103. In the present exemplary embodiment, the display terminal includes a display 261. However, this is not restrictive. A network I/F 257 connects the control unit 250 to the LAN 102, and transmits and receives various types of information to/from other apparatuses via the LAN 102.

<Hardware Configuration of Project Management Server 120>

FIG. 2C illustrates an example of a hardware configuration of the project management server 120. A control unit 280 including a CPU 281 controls operation of the entire project management server 120. The CPU 281 reads the project management program 370 stored in a ROM 282 and performs various types of control processing. A RAM 283 is used as a temporary storage area such as a main memory and a work area of the CPU 281. An HDD 284 stores various programs and various data tables to be described below. A network I/F 285 transmits and receives various types of information to/from other apparatuses via a network.

<Software Configuration of Various Programs>

FIG. 3 is a block diagram illustrating an example of a software configuration of programs running on the MFPs 110 to 113, the client PC 103, and the project management server 120. The functions of the automatic setting program 300 running on each MFP are implemented by the CPU 201. A UI control unit 301 provides a UI for operating the automatic setting program 300 for the user via the operation unit 208, and accepts user operations. A processing execution unit 302 executes various types of processing. A communication unit 303 transmits and receives data for performing processing to/from the project management server 120. An operation configuration data setting unit 304 performs processing for setting the operation configuration data.

The functions of the project creation program 320 running on the client PC 103 are implemented by the CPU 251. A UI control unit 321 provides a UI for operating the project creation program 320 for the user via the display 261, and accepts user operations via the mouse 259 and the keyboard 260. A processing execution unit 322 executes various types of processing. A data input/output control unit 323 performs processing for accepting an operation input from the user based on instructions from the UI control unit 321. A communication unit 324 performs processing for transmitting and receiving data to/from the project management server 120 based on instructions from the foregoing units.

The functions of the project management program 370 running on the project management server 120 are implemented by the CPU 281. A data storage unit 374 stores project data (FIGS. 4A to 4E) to be set into the MFPs 110 to 113. A data management unit 372 performs processing for managing the project data stored in the data storage unit 374. A processing execution unit 371 executes various types of processing. A communication unit 373 performs processing for transmitting and receiving data to/from the MFPs 110 to 113 and the client PC 103 based on instructions from the foregoing units.

<Project Data>

FIGS. 4A to 4E are charts illustrating an example of the project data managed by the data storage unit 374 of the project management server 120. FIGS. 4A to 4E illustrate examples of data tables managed by the data storage unit 374. While the data tables illustrated in FIGS. 4A to 4E include redundant portions for ease of description, a table configuration different from in this example may be used. For example, in the case of a relational database, redundancy may be reduced by normalization.

FIG. 4A illustrates a project data table storing descriptions of projects. The project data table includes a project identifier (ID) 401, a project name 402, and a deadline 403. Each record represents a project. Each project corresponds to a business deal. The project ID 401 is an ID for uniquely identifying a piece of project data. The project name 402 indicates the name of the project data. The deadline 403 indicates the deadline of the project.

FIG. 4B illustrates an MFP setting data table storing outlines of MFP settings. The MFP setting data table includes a setting ID 411, a device name 412, a project ID 413, operation setting items 414 to 416, a setting script 417, and a setting result 418. Each record corresponds to setting data on an MFP. The setting ID 411 is an ID for uniquely identifying a piece of setting data. One or more pieces of setting data identified by a setting ID or IDs 411 is/are associated with a project (business deal) identified by a project ID.

The device name 412 indicates the device name of the MFP. The project ID 413 corresponds to the project ID 401 of FIG. 4A. The project name and the deadline of the project data can be identified by referring to the project data table of FIG. 4A.

The operation setting items 414 to 416, namely, an IP address 414, an SMB server 415, and a firmware (FW) server 416 indicate operation setting values to be set into the MFP. The IP address 414 indicates a network address to be set into the MFP. The SMB server 415 indicates whether the MFP to be set publishes its directories using the SMB protocol. A setting value "ON" means to publish directories, and a setting value "OFF" means not. The FW server 416 indicates the address of an FW server 1002 (FIG. 10) from which FW is downloaded when the MFP upgrades its FW.

The setting script 417 contains a setting script (FIG. 7A) for the automatic setting program 300 to perform setting processing with. The setting script is a script generated by the project creation program 320. In the present exemplary embodiment, the actual setting script is stored in the MFP setting data table. Alternatively, the actual setting script may be stored as a file in another location and only the path to the actual setting script may be stored in the MFP setting data table. The setting result 418 indicates an execution result of the setting script. "OK" is stored if the setting processing is successful, and "NG" if the setting processing fails.

FIG. 4C illustrates a folder data table indicating folders set in the MFPs and folder structures thereof. The folder data table includes a folder ID 421, a setting ID 422, a parent folder ID 423, and a folder name 424. Each record corresponds to the setting contents of a folder. The folder ID 421 is an ID for uniquely identifying a piece of folder data. The setting ID 422 corresponds to the setting ID 411, and can identify a piece of setting data in FIG. 4B. The setting processing corresponding to which setting data is in execution when the folder (or folder structure) of FIG. 4C is set in the MFP can thus be known. For example, folders having a folder ID of "F0001" to "F0004" are ones generated when the setting data having a setting ID of "S002" is set into the MFP.

The parent folder ID 423 indicates the folder ID of a parent folder. The folder name 424 indicates the name of the folder. For example, in the case of the folder ID "F0001", the folder ID of the parent folder is "–" (none). Since the folder having the folder ID "F0001" is one at the highest level of the folder structure, the resulting folder path is "/reception_data_X". In the case of a folder ID "F0007", the folder ID of the parent folder is "F0006", and the resulting folder path is "/transmission_data_2/from_office_X". FIG. 10 illustrates the folder structures set in the MFPs 111 and 112 when the setting data having the setting ID "S002" is set into the MFP 111 and the setting data having the setting ID "S003" is set into the MFP 112 by using the folder data table of FIG. 4C.

FIG. 4D illustrates a transmission setting data table storing transmission setting data to be set into the MFPs. The transmission setting data table includes a transmission ID 431, a setting ID 432, a transmission condition 433, and a folder ID 434. Each record corresponds to a piece of transmission setting data. The transmission ID 431 is an ID for uniquely identifying the transmission setting data. The setting ID 432 corresponds to the setting ID 411, and identifies which piece of setting data is set into the MFP when the transmission setting data is used. For example, the pieces of transmission setting data having a transmission ID of "W001" and "W002" are used when the setting data having the setting ID "S001" is set into the MFP 110.

The transmission condition 433 indicates an execution condition in executing transmission processing. In the present exemplary embodiment, a character string included in the title of reception data is specified as the transmission condition 433. For example, in the case of the transmission ID "W001", the transmission condition 433 is 'title="X"'. This means that reception data including the character "X" in its title is to be transmitted. In the present exemplary embodiment, for ease of description, examples of the transmission condition 433 include only the titles of reception data. However, the transmission condition 433 is not limited to any specific contents, and various transmission conditions, including the main body, sender, and data size of reception data may be used.

The folder ID 434 corresponds to the folder ID 421 and indicates the destination folder to transmit the reception data to. For example, in the case of the transmission ID "W001", the reception data is transmitted to the folder having the folder ID "F0001". The folder ID "F0001" refers to the folder "reception_data_X" in FIG. 4C.

FIG. 4E illustrates a system check data table that manages checking scripts for checking the settings made between MFPs set in the same project and the settings for server access. The system check data table includes a setting ID 441, a checking script 442, and a check result 443. Each record corresponds to a checking script and an execution result of the checking script. The setting ID 441 corresponds to the setting ID 411 in FIG. 4B. A checking script is automatically generated by the project management program 370 and executed by the automatic setting program 300. The timing at which a checking script is generated by the project management program 370 is not limited in particular. For example, the project creation program 320 may generate a checking script in advance, and register the checking script in the project management server 120. In the present exemplary embodiment, the actual checking script is stored in the system check data table of FIG. 4E. However, the actual checking script may be stored as a file in another location and only the path to the actual checking script may be stored in the system check data table. The check result 443 indicates the execution result of the checking script. A value "OK" is stored if the execution result is a success, and a value "NG" if the execution result is a failure.

<MFP Setting Operation Procedure>

Figure 5:
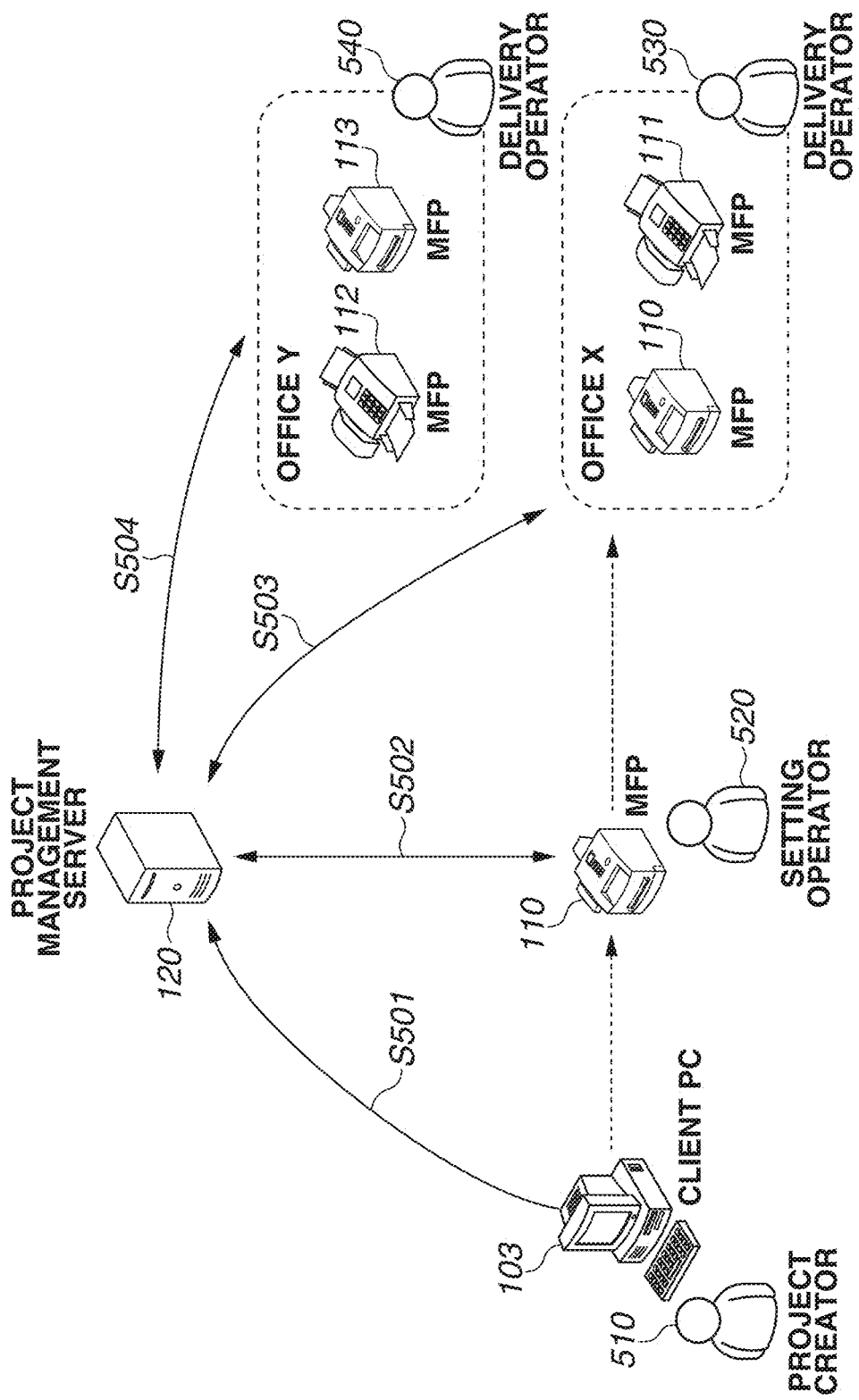
FIG. 5 is a flowchart illustrating setting operations of multifunction peripherals (MFPs).

FIG. 5 is a diagram illustrating processing for setting the image processing apparatuses according to the present exemplary embodiment. In this example, an operation procedure up to basic setting of the MFPs 110 to 113 will be described. In step S501, a project creator 510 creates a project. In this example, a salesperson serves as the project creator, and the project creator creates a project based on a customer's demand. The project creator inputs the outlines of the project and the setting contents of the MFPs 110 to 113 by using the project creation program 320. The setting contents of an MFP refer to the operation setting values of the MFP and the setting values of the transmission settings. The setting contents are transmitted as project data to the project management server 120 and stored in the data storage unit 374.

In step S502, a setting operator 520 performs MFP setting processing in an MFP assembly plant or MFP warehouse. After an MFP is assembled or when the MFP is shipped from the warehouse, the setting operator connects the MFP to the project management server 120 via a LAN (not illustrated). The setting operator presses a button 901 (FIG. 9A) on the UI of the automatic setting program 300. If the pressing of the button 901 is detected, the automatic setting program 300 obtains a setting script from the project management server 120 and starts setting processing.

In steps S503 and S504, delivery operators 530 and 540 perform check processing on the MFPs in respective delivery environments. The check processing mainly refers to processing for checking a state of transmission from one MFP to another and a state of communication of the MFPs. The delivery operators 530 and 540 connect a delivered MFP to the LANs 100 and 101 in the delivery locations, and press a check button 921 (FIG. 9C) on the UI of the automatic setting program 300. If the pressing of the check button 921 is detected, the automatic setting program 300 starts the check processing, and transmits the execution result to the project management server 120. The check processing will be described below with reference to FIG. 13. In such a manner, the delivery operators 530 and 540 perform the check processing on all the MFPs 110 to 113 delivered.

In the present exemplary embodiment, the setting processing of step S502 is described to be performed in an environment different from the delivery locations of the MFPs 110 to 113. However, the processing of steps S502 to S504 may be performed in the same environment. The setting operator 520 and the delivery operators 530 and 540 may be the same operator. The sharing of roles between the users (operators) is not limited in particular. The above is the description of the procedure of the setting processing on the MFPs 110 to 113 according to the present exemplary embodiment.

<UI of Project Creation Program 320>

FIGS. 6A to 6F are diagrams illustrating UI screens (display screens) displayed by the project creation program 320. The UI screens illustrated in FIGS. 6A to 6F are displayed on the client PC 103 when the project creator 510 performs the operation of step S501.

Figure 6A:
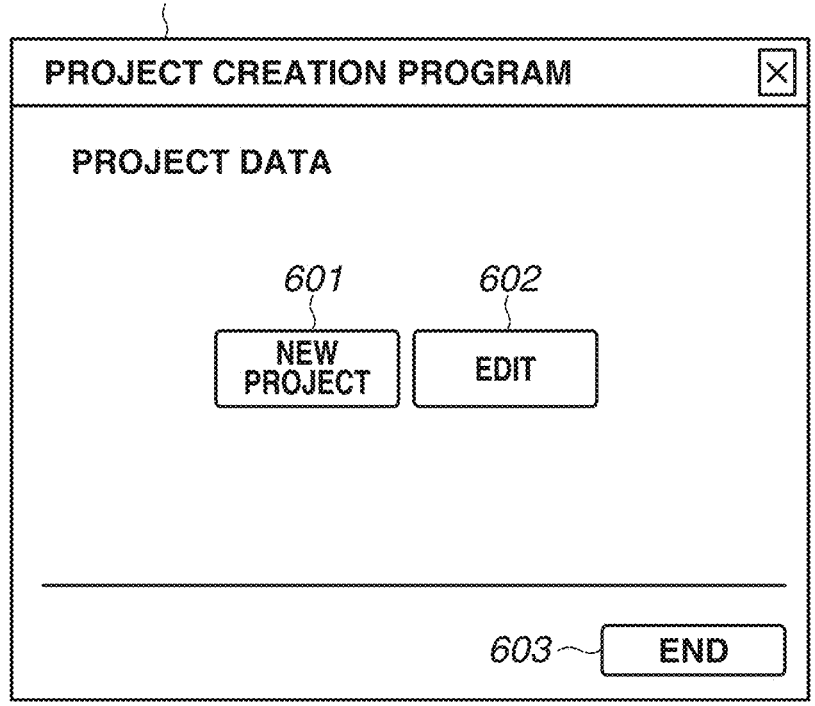

FIG. 6A illustrates an example of a top screen 600 of the project creation program 320. The top screen 600 includes a new project button 601, an edit button 602, and an end button 603. If the new project button 601 is detected to be pressed, the project creation program 320 displays a project creation screen 610. If the edit button 602 is detected to be pressed, the project creation program 320 displays a project editing screen (not illustrated). The end button 603 is a button for ending the project creation program 320.

Figure 6B:
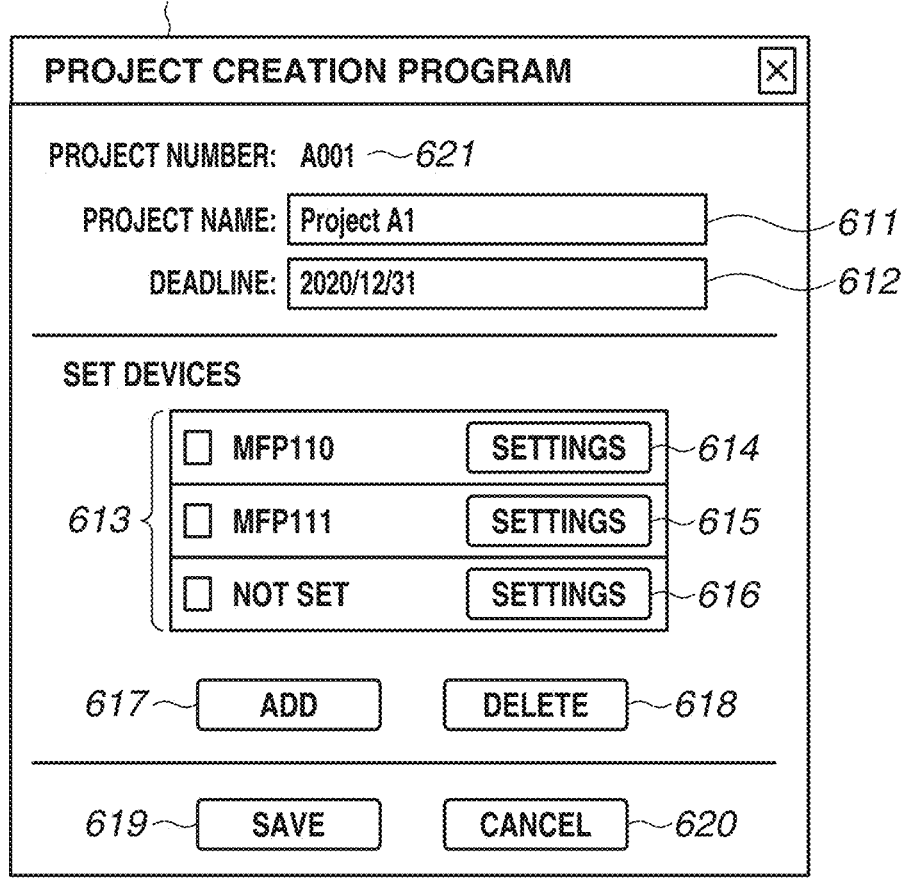

FIG. 6B illustrates the project creation screen 610 displayed when the new project button 601 on the top screen 600 is pressed. The project creation screen 610 includes a project number 621, a project name 611, a deadline 612, setting devices 613, an add button 617, a delete button 618, a save button 619, and a cancel button 620. FIG. 6B illustrates an example of the project creation screen 610 in generating project data with a project ID "A001". If the new project button 601 is pressed, a new project ID issued by the project management program 370 is displayed in the project number 621. The project name 611 is a text box into which a project name can be freely input. Suppose that a project name "Project A1" is input here.

The deadline 612 is a text box into which the deadline of the project can be input. The setting devices 613 lists the MFPs to be associated with the project. An MFP to be associated can be added to the setting devices 613 by pressing the add button 617. If a checkbox is selected and the delete button 618 is pressed, the specified MFP is deleted. If a setting button 614, 615, or 616 is detected to be pressed, the project creation program 320 displays an operation setting screen 630 (FIG. 6C) of the MFP to be set. The save button 619 is a button for saving the project data being generated or edited. If the save button 619 is detected to be pressed, the project creation program 320 transmits the project data to the project management server 120. Receiving the project data, the project management program 370 of the project management server 120 stores the received project data into the data storage unit 374. The cancel button 620 is a button for ending the creation or editing of the project without saving the project data being generated or edited. If the cancel button 620 is detected to be pressed, the project creation program 320 displays the top screen 600 without saving the project data.

FIG. 6C illustrates an example of the operation setting screen 630 displayed by the project creation program 320 when one of the setting buttons 614 to 616 on the project creation screen 610 is pressed. The operation setting screen 630 includes a project description 631, a device name 632, setting items 633, a save button 639, and a cancel button 640. FIG. 6C illustrates an example of the operation setting screen 630 when the setting button 616 on the operation setting screen 610 is pressed to generate setting data with a setting ID "S003" (FIG. 4B).

The project number and the project name set on the project creation screen 610 are reflected on the project description 631. The device name 632 is a text box. The entry into the device name 632 is stored in the device name 412 of the MFP setting data table in FIG. 4B. The setting items 633 display the settable operation setting items stored in the columns 414 to 416 of the MFP setting data table in FIG. 4B. The operation setting values can be set by using the text boxes and the checkbox. In the present exemplary embodiment, the settable operation setting items include an IP address 634, an FW server 635, and a presence or absence of SMB server publication 636. The operation setting values specified here are stored in the MFP setting data table (FIG. 4B).

A setting button 637 is a button for setting the folder structure of the MFP to be set. If the setting button 637 is detected to be pressed, the project creation program 320 displays a folder structure setting screen 650 (FIG. 6D) of the MFP to be set.

A setting button 638 is a button for making iFAX transmission settings of the MFP to be set. If the setting button 638 is detected to be pressed, the project creation program 320 displays a transmission setting screen 660 (FIG. 6E) of the MFP to be set. The save button 639 is similar to the save button 619 on the project creation screen 610. If the cancel button 640 is detected to be pressed, the project creation program 320 displays the project creation screen 610 without saving the current data.

FIG. 6D illustrates an example of the folder structure setting screen 650 displayed by the project creation program 320 when the setting button 637 on the operation setting screen 630 is pressed. The folder structure setting screen 650 includes a project and setting device description 651, a folder structure 652, folder names 653 to 655, a create button 656, a delete button 657, a save button 658, and a cancel button 659. FIG. 6D illustrates an example of the folder structure setting screen 650 in setting the folder data with a setting ID "S003" (FIG. 4C). The settings made on the operation setting screen 630 and the project creation screen 610 are reflected on the project and setting device description 651.

The folder structure 652 displays a tree view of the folder structure being generated. If the pressing of the create button 656 is detected with a folder being selected, the project creation program 320 generates a child folder under the selected folder, and displays a text box where a folder name can be specified. For example, if a folder "transmission_data_2" 654 is selected and the create button 656 is pressed, the project creation program 320 generates a child folder thereunder with the folder "transmission_data_2" being the parent folder, and displays a text box 655. The folder structure generated here is stored in the folder data table (FIG. 4C). The save button 658 is similar to the save buttons 619 and 639. If the cancel button 659 is pressed, the project creation program 320 displays the operation setting screen 630 without saving the current data.

FIG. 6E illustrates an example of the transmission setting screen 660 displayed by the project creation program 320 when the setting button 638 on the operation setting screen 630 is pressed. The transmission setting screen 660 includes a project and setting device description 661, transmission conditions 662, an add button 666, a delete button 667, a save button 668, and a cancel button 669. FIG. 6E illustrates an example of the transmission setting screen 660 in setting transmission conditions with a setting ID "S003". The project and setting device description 661 is similar to the project and setting device description 651.

The transmission conditions 662 display transmission conditions to be set into devices. The transmission conditions are input to text boxes 663. If "X" is input to a text box 663, data including "X" in its title is set as a transmission target. If the add button 666 is detected to be pressed, the project creation program 320 adds a transmission condition. If the delete button 667 is detected to be pressed with a checkbox checked, the project creation program 320 deletes the specified transmission condition. If a transmission destination setting button 664 or 665 is detected to be pressed, the project creation program 320 displays a transmission destination setting screen 670 (FIG. 6F) of the transmission condition. The transmission condition specified here is stored in the transmission setting data table (FIG. 4D). In this example, the transmission condition is stored with the transmission ID "W003". The save button 668 is similar to the save buttons 619, 639, and 658. If the cancel button 669 is detected to be pressed, the project creation program 320 returns to the operation setting screen 630 without saving the current data.

FIG. 6F illustrates an example of the transmission destination setting screen 670 displayed by the project creation program 320 when the transmission destination setting button 664 or 665 on the transmission setting screen 660 is pressed. The transmission destination setting screen 670 includes a project and setting device description 671, transmission destination settings 672, a set button 678, and a cancel button 679. FIG. 6F illustrates an example of the transmission destination setting screen 670 when the transmission destination setting button 664 is pressed to set a transmission destination corresponding to the setting ID "S003" and the transmission ID "W003".

The project and setting device description 671 is similar to the project and setting device description 651. The transmission destination settings 672 display the transmission condition specified on the transmission setting screen 660 as a transmission condition 673, as well as the device names and folder structures of devices that correspond to the setting IDs belonging to the same project as the setting ID "S003" does and of which a folder structure is set. From the MFP setting data table (FIG. 4B), the setting ID "S003" belongs to the project having the project ID "A001". The setting IDs belonging to the project having the project ID "A001" are "S001" to "S004". From the folder data table (FIG. 4C), the setting IDs of the devices that correspond to the setting IDs "S001" to "S004" and where a folder structure is set are "S002" and "S003". The corresponding folders have folder IDs "F0001" to "F0007". The transmission destination settings 672 thus display the device names "MFP111" and "MFP112" of the devices corresponding to the setting IDs "S002" and "S003", and the folder structures of the respective devices. A folder 674 is displayed with the folder name identified by the folder ID "F0001", a folder 675 the folder name identified by the folder ID "F0002", a folder 676 the folder name identified by the folder ID "F0003", and a folder 677 the folder name identified by the folder ID "F0004".

If the set button 678 is detected to be pressed with a displayed folder being selected, the project creation program 320 sets the selected folder as the transmission destination under the transmission condition specified on the transmission setting screen 660, saves the current data, and displays the transmission setting screen 660. For example, if the set button 678 is pressed with the folder 676 being selected, the project creation program 320 sets "F0003" as the folder ID of the transmission destination corresponding to the transmission ID "W003". If the cancel button 679 is detected to be pressed, the project creation program 320 returns to the transmission setting screen 660 without saving the transmission destination. It should be noted that the order of screen transition in setting a transmission destination and the setting method illustrated in FIGS. 6A to 6F are merely an example.

<Setting Script and Operation Configuration Data>

FIG. 7A illustrates an example of a setting script describing a procedure for automatically performing the MFP setting processing described in the MFP setting operation procedure (step S502). FIG. 7B is a diagram illustrating an example of operation configuration data on the MFP 112 after the execution of the setting script. The operation configuration data is stored in the HDD 207 of the MFP 112.

The setting script is stored in the data storage unit 374 of the project management server 120 as part of project data generated by the project creation program 320. The screens in generating the project data are as illustrated in FIGS. 6A to 6F. The setting script is executed by the processing execution unit 302 of the automatic setting program 300 on the MFP 112. The setting script is written in Extensible Markup Language (XML), and includes a script section 700, a setting identification section 701, and a setting value description section 702. While in FIG. 7A the setting script is expressed in XML, the setting script is not limited to XML and may be written as a shell script. The same applies to other scripts related to the setting processing.

FIG. 7A illustrates an example of a setting script "set_S001.xml" corresponding to the setting ID "S003". The script section 700 describes a setting script and is defined by a <settingScript> tag. The setting identification section 701 describes a setting ID and includes an <id> tag. The setting value description section 702 describes the setting values to be set into the MFP 112 and is defined by a <values> tag.

The setting value description section 702 includes a device name 710, an IP address 711, a presence or absence of SMB server setting 712, an FW server address 713, a folder structure 715, and transmission settings 720 and 721. The device name 710 is defined by a <deviceName> tag, the IP address 711 by an <ipAddress> tag, and the FW server address 713 by a <fwServer> tag, where the values specified in the respective setting items 633 (FIG. 6B) are set. The presence or absence of SMB server setting 712 is defined by an <smbServer> tag. If an SMB server is set, the presence or absence of SMB server setting 712 includes a setting value of "ON". If not, the presence or absence of SMB server setting 712 includes a setting value of "OFF".

The folder structure 715 is defined by a <folders> tag and includes <folder> tags. The values specified on the folder structure setting screen 650 (FIG. 6D) are set in the <folder> tags. A <folder> tag includes id and parent attributes. The id attribute is an ID for uniquely identifying the folder. The parent attribute is an ID (folder ID 717) for identifying the parent folder. A value of "none" in the parent attribute means that there is no parent folder (see a <folder> tag 716 in FIG. 7A).

The folder structure 715 includes folder names defined by <name> tags. The <folder> tag 716 indicates data corresponding to the folder ID "F0005" in FIG. 4C, and a <folder> tag 717 the folder ID "F0007". Transmission settings are defined by <forward> tags. The transmission settings include a transmission condition 723, a transmission destination 724, and a transmission destination folder path 725, on which the values set on the transmission setting screen 660 (FIG. 6E) and the transmission destination setting screen 670 (FIG. 6F) are reflected. A <forward> tag includes a protocol attribute, which specifies the protocol to be used in transmitting data to the transmission destination. In this example, data is either transmitted to outside by using the SMB protocol or transmitted to a local folder (folder in the own MFP). For SMB-based transmission, the protocol attribute is "smb". In the case of transmission to a folder in the own MFP, the protocol attribute is "local". In the present exemplary embodiment, only the SMB protocol is used to transmit data to outside. However, if other transmission protocols such as the File Transfer Protocol (FTP) and Web Distributed Authoring and Versioning (WebDAV) are available, such protocols may also be specified.

The transmission condition 723 is defined by a <condition> tag, and includes a <title> tag. The character "X" specified in the <title> tag is the transmission condition. The transmission destination 724 is defined by a <device> tag. The transmission destination 724 is set only if the transmission protocol is the SMB protocol.

The transmission destination 724 includes a device name defined by a <name> tag and an IP address defined by an <ipAddress> tag. The transmission destination folder path 725 is defined by a <path> tag, where the folder path is written in an expanded form. The <forward> tag in the transmission setting 720 describes the transmission settings corresponding to the transmission ID "W003" in FIG. 4D. The <path> tag (transmission destination folder path 725) describes the expanded folder path of the transmission destination having the folder ID "F0003". The <device> tag (transmission destination 724) describes device information on the device that, as can be seen from the folder data table (FIG. 4C), is associated with the setting ID "S002" corresponding to the folder ID "F0003". Similarly, the <forward> tag in the transmission setting 721 describes data corresponding to the transmission ID "W004". If the setting script of FIG. 7A is executed by the MFP 112, operation setting values are set in the respective operation setting items as illustrated in FIG. 7B.

<Checking Script>

FIG. 8 is a diagram illustrating an example of a checking script describing a check operation procedure for automatically checking MFPs in the MFP delivery operations described in steps S503 and S504. The checking script is generated when the automatic setting program 300 receives a request to start the MFP setting operation procedure (step S502) from an MFP and stored in the data storage unit 374 of the project management server 120 as part of the project data. In the present exemplary embodiment, the checking script is described to be generated upon reception of a request to obtain the setting script from the automatic setting program 300.

FIG. 8 illustrates an example of check0003.xml that is a checking script corresponding to the setting ID "S003". The checking script is written in XML, and includes a script section 800, a setting identification section 801, a retry section 810, a client section 820, and a server section 830.

The script section 800 describes the checking script and includes a <checkingScript> tag. The setting identification section 801 describes a setting ID and includes an <id> tag. The retry section 810 describes how to retry the execution of the checking script, and is defined by a <retry> tag. The retry section 810 includes a retry interval defined by an <interval> tag and a time limit defined by a <limited> tag.

Some business deals can include delivery of MFPs to different offices as in the present exemplary embodiment, or delivery of a large number of MFPs over a delivery period of several months or more. In such cases, if checking scripts are executed immediately after the delivery of the MFPs, some MFPs which are to serve as a data transmission destination can be left not being set for a certain period of time. Checking scripts are therefore made configurable in terms of retries, taking the period into account. A checking script that results in an error when executed immediately after completion of the setting processing on a transmission source MFP can thus be successfully re-executed after completion of the setting processing on a transmission destination MFP. While in this example the retry interval is automatically set to "auto", the project creation program 320 may set the retry interval to "day", which means every day, or "hour", which means every hour. For the time limit, the value specified by the deadline 612 (FIG. 6B) is specified.

The state where the retry interval is automatic ("auto") refers to where the MFP automatically determines the retry interval. For example, the checking script can be re-executed when the MFP is activated, sleeps, and/or wakes up from sleep.

The retry section 810 is set so that checking is retried every day until 2020/12/31. The client section 820 describes client check items and is defined by a <client> tag. The client section 820 includes communication destinations 821 and 822 defined by <destination> tags. A <destination> tag includes a protocol attribute, and specifies the protocol to be used to check the communication destination. A communication destination includes an IP address defined by an <ip> tag, a device name defined by a <deviceName> tag, and a folder path defined by a <path> tag. The <ip> and <deviceName> tags describe the IP address and device name of a server to communicate with. The <path> tag describes a transmission destination folder path. The <destination> tag in the communication destination 821 includes a setting value "ping", which indicates that the state of communication with an FW server specified by the FW server 416 in FIG. 4B is to be checked. Communication checks other than transmission settings are thus performed by checking the presence or absence of a response from the FW server by using a ping protocol.

The <destination> tag in the communication destination 822 indicates that a communication check corresponding to the transmission ID "W003" is performed by using the SMB protocol. From FIG. 4D, the transmission destination corresponding to the transmission ID "W003" is the folder having the folder ID "F0003". From FIG. 4C, the folder having the folder ID "F0003" is located in the MFP associated with the setting ID "S002", and the transmission destination folder path is "/transmission_data 1/from_office_Y".

From FIG. 4B, the device name corresponding to the setting ID "S002" is "MFP111", and the IP address is "172.24.1.2". The communication check is performed by checking whether a hidden file can be generated under "172.24.1.2/transmission_data_1/from_office_Y" by the SMB protocol. The server section 830 describes server check items and is defined by a <server> tag. The server section 830 includes a transmission source 831 defined by a <source> tag. The transmission source 831 includes an IP address defined by an <ip> tag, a device name defined by a <deviceName> tag, and a folder path defined by a <path> tag. The <ip> and <deviceName> tags describe the IP address and device name of the client serving as the transmission source. The <path> tag describes the transmission destination folder path to which the client transmits data.

The <source> tag describes information about a transmission source that is other than the own MFP and where the own MFP is set as a transmission destination. From FIG. 4C, the folder IDs of the folders generated in the MFP by the setting of the setting ID "S003" are "F0005" to "F0007". From FIG. 4D, the transmission IDs of the transmission settings including such folders as a transmission destination are "W002" and "W004". The transmission settings corresponding to the transmission ID "W004" include transmission settings from the own MFP to the own MFP. The information about the transmission source described in the <source> tag is thus information about an MFP (other than the own MFP) or other device where the folder having the folder ID corresponding to the transmission ID "W002" is set as the transmission destination.

The transmission source 831 defined by the <source> tag indicates that a communication check corresponding to the transmission ID "W002" is to be performed. The MFP where the folder having the folder ID corresponding to the transmission ID "W002" is set as the transmission destination is the one where the setting data having the setting ID "S001" is set, which is the "MFP 110" from FIG. 4B. The folder path to the folder having the folder ID "F0007" corresponding to the transmission ID "W002" is "/transmission_data_2/from_office_X". Communication between the transmission source MFP and the folder of the own MFP can thus be checked by determining whether the MFP having the IP address "172.24.1.1" can generate a file under "/transmission_data_2/from_office_X".

<Automatic Setting Program 300>

Figure 9A:
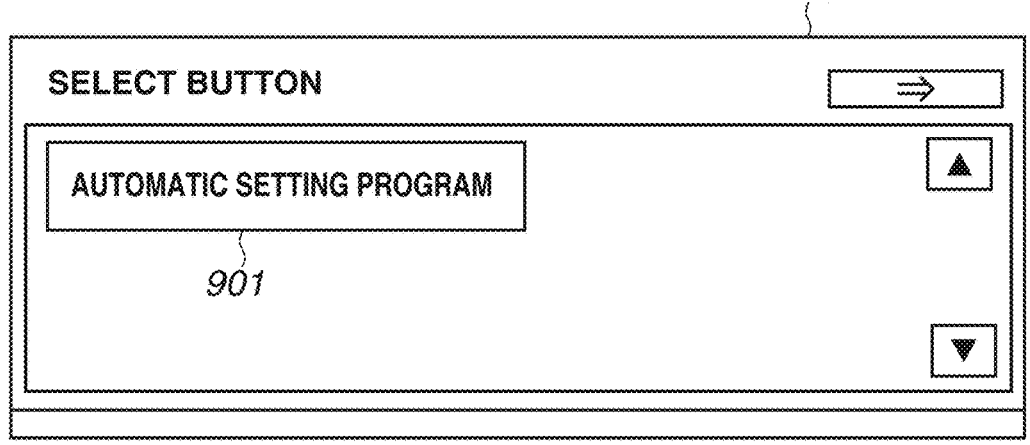
FIGS. 9A, 9B, and 9C are diagrams illustrating examples of UI screens displayed by an automatic setting program.
Figure 9B:
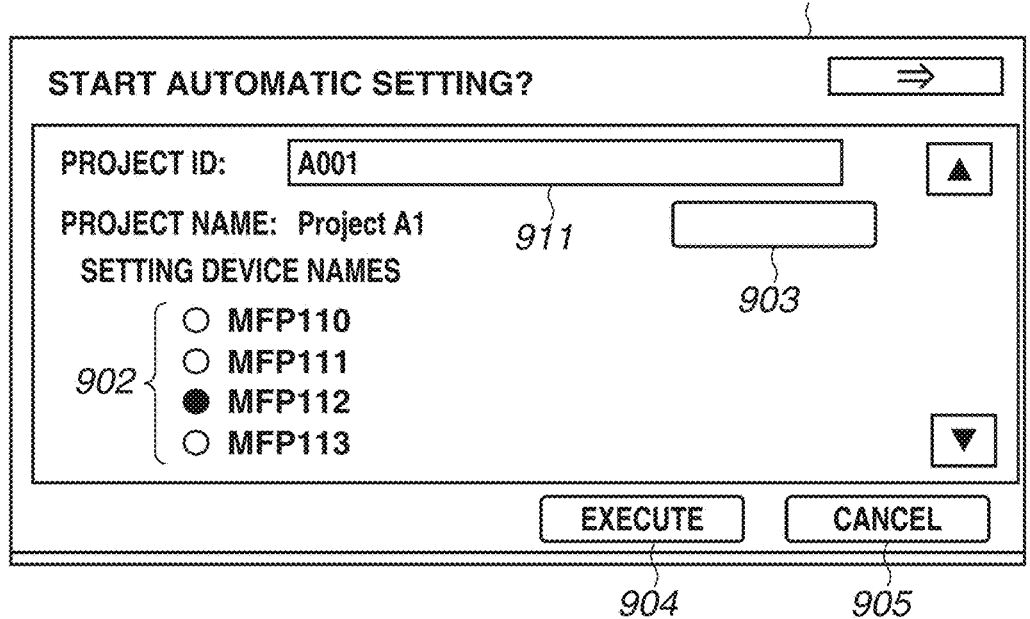
Figure 9C:
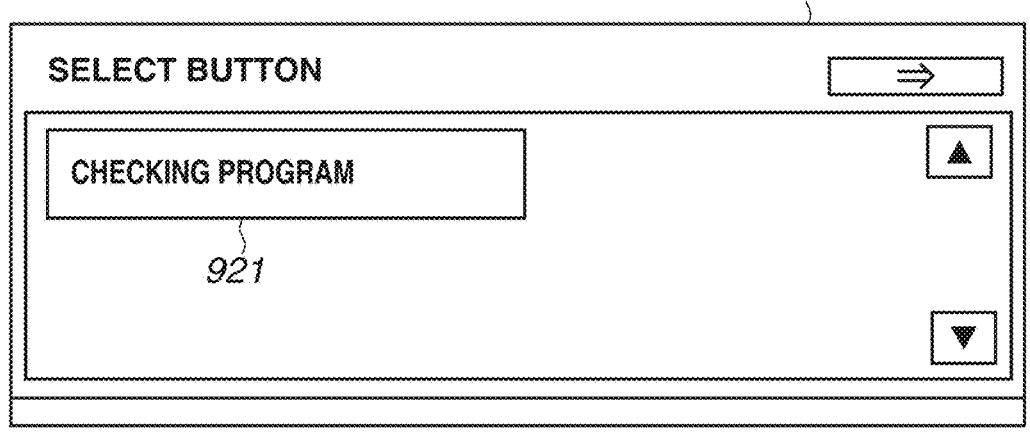

FIGS. 9A, 9B, and 9C illustrate examples of UI screens displayed on the operation unit 208 of an MFP. The UI screens are operated by the setting operator 520 and the delivery operators 530 and 540 in making the operations of steps S502, S503, and S504, respectively. FIG. 9A illustrates a UI screen 900, which includes a button 901 for activating the automatic setting program 300.

FIG. 9B illustrates an example of a UI screen 910 that is displayed when triggered by pressing of the button 901. The UI screen 910 includes a project ID text box 911, a search button 903, an execution button 904, and a cancel button 905, and is displayed by the automatic setting program 300. If the search button 903 is detected to be pressed, the project creation program 320 transmits the input project ID "A001" to the project management server 120, obtains a list of setting devices associated with the project ID "A001" from the project management program 370, and displays radio buttons and a setting device list 902. The execution button 904 is a button for executing automatic setting processing.

The cancel button 905 is a button for ending the automatic setting program 300. FIG. 9C illustrates a UI screen 920, which includes the check button 921 for performing a system configuration check by the automatic setting program 300.

<System Configuration>

FIG. 10 is a diagram illustrating a system configuration constructed by completing the setting processing of Project A1. The MFPs 110 and 111 are set in the office X. The MFPs 112 and 113 are set in the office Y. The transmission settings corresponding to the setting IDs "W001" and "W002" are made in the MFP 110. A folder structure 1000 is generated in the MFP 111. A folder structure 1001 is generated and the transmission settings corresponding to the transmission IDs "W003" and "W004" are made in the MFP 112.

<Procedure of MFP Setting Processing>

Figure 11:
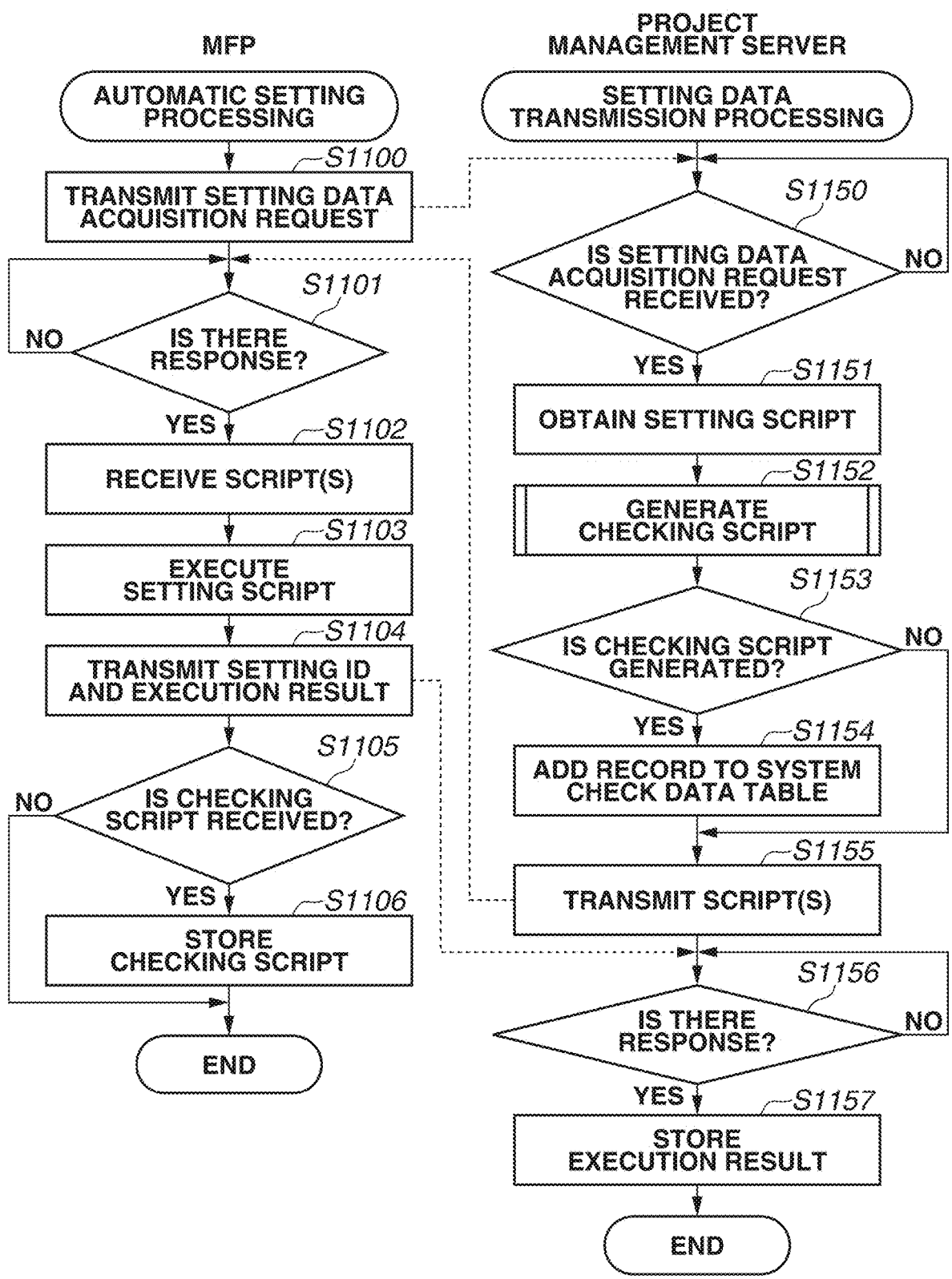
FIG. 11 is a flowchart illustrating automatic setting processing by an MFP and setting data transmission processing by a project management server.

FIG. 11 is a flowchart related to automatic setting processing by an MFP and setting data transmission processing by the project management server 120. Steps S1100 to S1106 are implemented by the CPU 201 executing the automatic setting program 300. Steps S1150 to S1157 are implemented by the CPU 281 executing the project management program 370. Steps S1100 to S1106 represent the automatic setting processing executed by the automatic setting program 300 by the setting operator 520 selecting an image processing apparatus to perform setting processing on and pressing the execution button 904 (FIG. 9B). Steps S1150 to S1157 represent processing contents executed when triggered by reception of a setting data acquisition request transmitted from the automatic setting program 300 in step S1100. The processing contents are executed by the project management program 370 of the project management server 120 until the setting result has been stored.

In step S1100, the communication unit 303 transmits a setting data acquisition request to the project management server 120. Specifically, the communication unit 303 transmits the setting data acquisition request to the communication unit 373 of the project management program 370. The setting data acquisition request includes the setting ID of the image processing apparatus to be set, selected from the setting device list 902.

In step S1150, the communication unit 373 of the project management server 120 monitors reception of the setting data acquisition request from the MFP. In step S1151, after the reception of the setting data acquisition request from the MFP, the data management unit 372 obtains the setting information corresponding to the setting ID obtained in step S1150 from the data storage unit 374. Specifically, the data management unit 372 obtains the setting script corresponding to the obtained setting ID from the MFP setting data table (FIG. 4B). For example, if the obtained setting ID is "S003", the data management unit 372 obtains the setting script "set_S003.xml".

In step S1152, the processing execution unit 371 generates a checking script corresponding to the setting ID obtained in step S1150. Detailed processing for generating the checking script will be described below with reference to FIG. 12. In step S1153, the processing execution unit 371 determines whether a checking script is generated in step S1152. If a checking script is determined to be generated (YES in step S1153), the processing proceeds to step S1154. If no checking script is determined to be generated (NO in step S1153), the processing proceeds to step S1155.

In step S1154, the data management unit 372 adds a record corresponding to the setting ID obtained in step S1150 to the system check data table (FIG. 4E) in the data storage unit 374. The added record includes the checking script generated in step S1152 or storage location information about the checking script. For example, if the setting ID obtained in step S1150 is "S003", the data management unit 372 adds the setting ID "S003" and the checking script "check0003.xml" to the record in association with each other.

In step S1155, the communication unit 373 transmits the setting script obtained in step S1151, and the checking script generated in step S1152 if any, to the MFP.

In step S1101, the communication unit 303 of the MFP monitors the presence or absence of a response from the project management server 120. In step S1102, the communication unit 303 receives the script(s) transmitted from the project management server 120. In step S1103, the processing execution unit 302 executes the setting script received in step S1102. The operation configuration data setting unit 304 sets the operation setting values (710 to 713, 720, and 721) specified in the setting script. The processing execution unit 302 generates folders based on the folder structure 715 specified in the setting script.

In step S1104, the communication unit 303 transmits the setting ID transmitted in step S1100 and the execution result of the setting script executed in step S1103 to the project management server 120. In step S1156, the communication unit 373 of the project management server 120 monitors reception of the execution result of the setting script from the MFP.

In step S1105, the processing execution unit 302 of the MFP determines whether a checking script is received in step S1102. If a checking script is determined to be received (YES in step S1105), the processing proceeds to step S1106. If no checking script is determined to be received (NO in step S1105), the processing ends. In step S1106, the processing execution unit 302 stores the checking script received in step S1102 into the HDD 207. The processing ends.

In step S1156, if the project management server 120 receives the setting ID and the execution result of the setting script (YES in step S1156), the processing proceeds to step S1157. In step S1157, the data management unit 372 stores the received execution result into the MFP setting data table (FIG. 4B) in the data storage unit 374. Specifically, the data management unit 372 stores the execution result into the setting result 418 of the record corresponding to the setting ID received in step S1156. The above is the automatic setting processing by the MFP and the setting data transmission processing by the project management server 120.

The reason why the configuration of FIG. 11 (configuration where a checking script is generated at timing when the project management server 120 obtains a setting data acquisition request) is employed is to save the trouble of correcting the checking script. For example, if a checking script is generated at timing when setting data is stored in the project management server 120, the checking script is corrected each time the setting data is modified. As illustrated in FIG.

11, if a checking script is generated after the reception of the setting data acquisition request, the setting data will not be modified and the trouble of correcting the checking script can be saved.

The timing when the MFP obtains the checking script from the project management server 120 is not limited to that of FIG. 11. For example, the MFP may obtain the checking script from the project management server 120 at timing when the execution result of the setting script is transmitted to the project management server 120 in step S1104. In other words, the MFP may obtain the checking script at any timing after the setting processing is executed based on the setting script. The project management server 120 can generate the column of the check result 443 in the system check data table (FIG. 4E) before the execution result of the checking script is transmitted from the MFP. The timing of generation of the check result 443 is not particularly limited, either.

<Checking Script Generation Processing>

Figure 12:
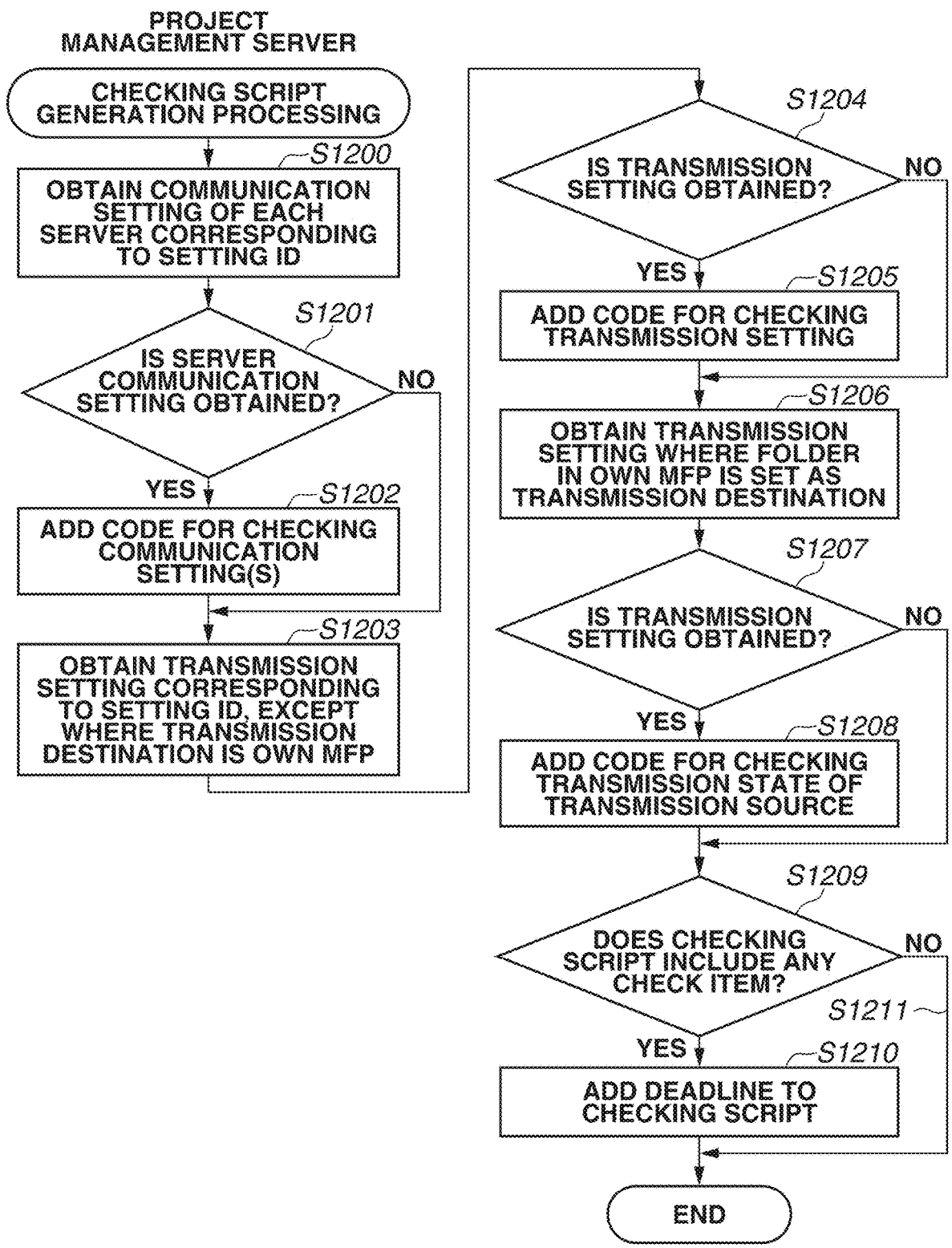
FIG. 12 is a flowchart illustrating checking script generation processing by the project management server.

FIG. 12 is a flowchart of processing for generating the checking script (FIG. 8) by the project management server 120 according to the present exemplary embodiment. In this example, the processing is performed by the project management program 370 on the project management server 120. In step S1200, the data management unit 372 obtains a communication setting (server communication setting) of each server corresponding to the setting ID obtained in step S1150 from the MFP setting data table (FIG. 4B) stored in the data storage unit 374. The processing proceeds to step S1201. In this example, the FW server 416 is the only server communication setting item.

In step S1201, the processing execution unit 371 determines whether any server communication setting is obtained in step S1200. If a server communication setting or settings is/are determined to be obtained (YES in step S1201), the processing proceeds to step S1202. If no server communication setting is determined to be obtained (NO in step S1201), the processing proceeds to step S1203. In this example, suppose that the setting ID "S003" is obtained in step S1150. In step S1200, a server communication setting "111.222.33.44" is thus obtained.

In step S1202, the processing execution unit 371 adds code for checking the communication setting obtained in step S1200 to the communication destination 821 in the checking script (FIG. 8).

In step S1203, the data management unit 372 obtains a transmission setting corresponding to the setting ID based on the folder data table (FIG. 4C) and the transmission setting data table (FIG. 4D) stored in the data storage unit 374. Here, transmission settings where the transmission destination is the own MFP are excluded.

A method for determining whether the transmission destination is the own MFP will be described in specific terms. From FIG. 4D, the transmission IDs associated with the setting ID "S003" are "W003" and "W004". The folder ID of the transmission destination corresponding to the transmission ID "W003" is "F0003". The folder ID of the transmission destination corresponding to the transmission ID "W004" is "F0005". By referring to FIG. 4C, if the setting ID associated with a folder ID coincides with the setting ID ("S003") corresponding to the setting ID for which the transmission settings are to be obtained, that transmission destination is determined to be the own MFP. In this example, the folder having the folder ID "F0005" is one generated when the setting data having the setting ID "S003" is set into the MFP. Since the folder to be a transmission destination has already been generated in the MFP where the setting data having the setting ID "S003" is set, the transmission destination corresponding to the transmission ID "W004" is determined to be the own MFP. The transmission setting having the transmission ID "W004" is thus excluded.

In step S1204, the processing execution unit 371 determines whether a transmission setting is obtained in step S1203. If a transmission setting is determined to be obtained (YES in step S1204), the processing proceeds to step S1205. If no transmission setting is determined to be obtained (NO in step S1204), the processing proceeds to step S1206. In step S1205, the processing execution unit 371 adds code for checking the transmission setting obtained in step S1203 to the checking script (communication destination 822). The processing proceeds to step S1206.

In step S1206, the data management unit 372 obtains a transmission setting (transmission source information) where a folder in the own MFP is set as a transmission destination among the transmission settings corresponding to the project ID to which the setting ID obtained in step S1150 belongs, based on the data tables stored in the data storage unit 374. The data management unit 372 here excludes transmission settings where the transmission source is the own MFP. For example, from FIG. 4C, the folder IDs of the folders corresponding to the setting ID "S003" are "F0005", "F0006", and "F0007". From FIG. 4D, the transmission IDs of the transmission settings where any of the folders having the folder IDs "F0005" to "F0007" is set as a transmission destination are "W002" and "W004". Since the transmission ID of the transmission setting where the transmission source is not the own MFP is "W002", the data management unit 372 obtains the transmission setting having the transmission ID "W002" in step S1206. The processing then proceeds to step S1207.

In step S1207, the processing execution unit 371 determines whether a transmission setting is obtained in step S1206. If a transmission setting is determined to be obtained (YES in step S1207), the processing proceeds to step S1208. If no transmission setting is determined to be obtained (NO in step S1208), the processing proceeds to step S1209.

In step S1208, the processing execution unit 371 adds code for checking the transmission state of the transmission source to the checking script (transmission source 831) based on the transmission setting obtained in step S1206. In step S1209, the processing execution unit 371 determines whether the checking script include any check item. If any check item is determined to be included (YES in step S1209), the processing proceeds to step S1210. If no check item is determined to be included (NO in step S1209), there is no checking script and the processing ends.

In step S1210, the data management unit 372 obtains the deadline corresponding to the project ID to which the setting ID obtained in step S1150 belongs based on the project data table (FIG. 4A) and the MFP setting data table (FIG. 4B) stored in the data storage unit 374. The processing execution unit 371 adds the obtained deadline to the retry section 810 of the checking script. The processing ends.

<Execution Procedure of Checking Script>

Figure 13:
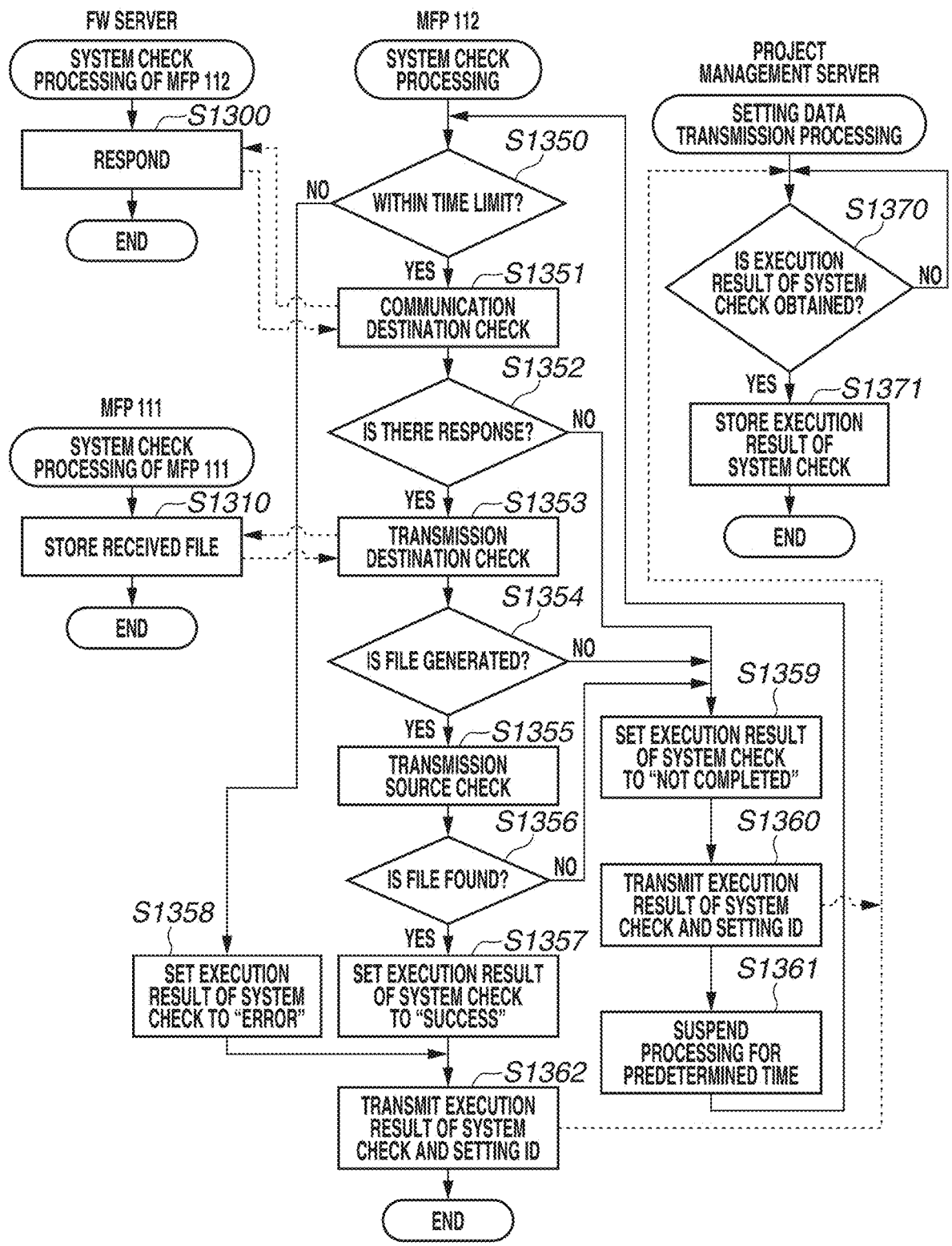
FIG. 13 is a flowchart illustrating a system check method performed between MFPs and the project management server.

FIG. 13 is a flowchart illustrating a system check method performed between MFPs and the project management server 120 according to the present exemplary embodiment. The processing of step S1300 is performed by the FW server 1002. The processing of step S1310 is performed by the MFP 111. The processing of steps S1350 to S1362 is performed by the MFP 112. The MFP 111 serves as a transmission destination for the MFP 112.

Steps S1350 to S1362 are implemented by the CPU 201 executing the automatic setting program 300. Steps S1370 and S1371 are implemented by the CPU 281 executing the project management program 370. Steps S1350 to S1362 represent system configuration check processing by the automatic setting program 300 that is executed by the delivery operator 540 pressing the check button 921 (FIG. 9C). Steps 51370 and S1371 represent the processing performed by the project management program 370 of the project management server 120 from reception of a system check result update request from the automatic setting program 300 to storing of a check result.

In step S1350, the processing execution unit 302 determines whether the system check is executed within a time limit. Specifically, the processing execution unit 302 checks whether the system check is executed within the time limit (project deadline) set in the <limited> tag in the retry section 810 of the checking script. If the system check is determined to be executed within the time limit (YES in step S1350), the processing proceeds to step S1351. If the system check is determined to not be executed within the time limit (NO in step S1350), the processing proceeds to step S1358. In step S1358, the processing execution unit 302 sets the result of the system check to "error".

In step S1351, the communication unit 303 performs a communication destination check by using the ping protocol based on the communication destination 821 in the client section 820 of the checking script. Specifically, the communication unit 303 issues a ping command to the IP address "111.222.333.443" described in the communication destination 821. In step S1300, the FW server 1002 identified by the IP address "111.222.333.444" receives the ping command and responds to the communication unit 303 of the MFP 112. While the state of communication between the MFP 112 and the FW server 1002 is described to be checked here, the target to be checked for the state of communication is not limited to the FW server 1002.

In step S1352, the processing execution unit 302 determines whether there is a response from the FW server 1002 in step S1351. If there is a response (YES in step S1352), the processing execution unit 302 determines that communication can be performed with the FW server 1002, and the processing proceeds to step S1353. If there is no response (NO in step S1352), the processing execution unit 302 determines that communication is unable to be performed with the FW server 1002, and the processing proceeds to step S1359.

In step S1353, the communication unit 303 performs a check by using a protocol other than the ping protocol based on the communication destination 822 in the client section 820 of the checking script. The processing proceeds to step S1354. Specifically, the communication unit 303 generates a hidden file in the folder path "/transmission_data_1/from_office_Y" at the IP address "172.24.1.2" described in the communication destination 822 to check whether data can be transmitted to the specified transmission destination. In this example, the device name "MFP112" is used as the filename of the file to be generated, and the IP address "172.29.1.1" is written in the file. The file generated here may be of any format as long as the setting ID "S003" can be identified from the filename or the contents of the file.

In step S1310, the MFP 111 that has the IP address "172.24.1.2" and where setting data of the same project is set stores the file received from the MFP 112. In step S1354, the processing execution unit 302 determines whether the file is generated in step S1353. If the file is determined to be generated (YES in step S1354), the processing proceeds to step S1355. If the file is determined to not be successfully generated (NO in step S1354), the processing proceeds to step S1359. Whether the file is generated is determined by calling an application programming interface (API) for file generation and referring to the return value.

In step S1355, the processing execution unit 302 checks the transmission source based on the server section 830 of the checking script. Specifically, the processing execution unit 302 checks whether there is a specific hidden file in the folder path described in the transmission source 831. In this example, the processing execution unit 302 checks the folder path "/transmission_data_2/from_office_X" for a file that has the filename "MFP110" and where the IP address "172.24.1.1" is written. The presence of the file in the folder indicates that transmission processing has successfully been performed with the MFP 112 as the transmission destination.

In step S1356, the processing execution unit 302 determines whether the file is found in step S1355. If the file is found (YES in step S1356), the processing proceeds to step S1357. If the file is not found (NO in step S1356), the processing proceeds to step 51359. If the file is found, the processing execution unit 302 may notify the transmission source that the file transmission processing is successful. In other words, in step S1356, the MFP 112 may perform the processing performed by the MFP 111 in step S1310.

In step S1357, the processing execution unit 302 sets the execution result of the system check to "success", and deletes the file found in step S1355.

In step S1362, the communication unit 303 transmits the execution result of the system check set in step S1357 or S1358 and the setting ID "S003" described in the setting identification section 801 to the project management server 120. The processing ends. In step S1359, the processing execution unit 302 sets the execution result of the system check to "not completed". The processing proceeds to step S1360. In step S1360, the communication unit 303 transmits the execution result set in step S1359 and the setting ID "S003" described in the setting identification section 801 to the project management server 120. In step S1361, the processing execution unit 302 stops processing until as much time as set in the <interval> tag in the retry section 810 of the checking script elapses. The communication unit 303 suspends the processing of the MFP 112 until a predetermined time elapses or when the state of the MFP 112 changes, like when the MFP 112 is activated or sleeps. After the lapse of the certain time, the processing returns to step S1350.

Examples of the case where the transmission source check is not successful in step S1356 include where the setting processing of the transmission source device is not completed and the file is unable to be generated in the folder of the MFP 112. The processing of step S1361 is provided to address such cases. After the processing has returned from step S1361 to step S1350 repeatedly a predetermined number of times, the processing execution unit 302 may notify the project management server 120 of the error of the system check and end the processing of FIG. 13 without returning from step S1361 to S1350.

In step S1370, the processing execution unit 371 of the project management server 120 determines whether the execution result of the system check is obtained. If the execution result of the system check is determined to be obtained (YES in step S1370), the processing proceeds to step S1371. In step S1371, the processing execution unit 371 stores the execution result into the data storage unit 374. If the execution result of a system check is already stored, the processing execution unit 371 updates the execution result of the system check with the obtained new result. Then, the processing ends.

As described above, according to the present exemplary embodiment, the information processing system including a plurality of MFPs automatically generates check items about the system configuration and automatically performs checks upon delivery. This improves the operation efficiency at the time of delivery. Since the setting scripts and the execution results of the checking scripts are managed by the project management server 120, a check can be made in the event of an error and the occurred error can be handled immediately.

<Setting Processing in MFP>

The setting processing performed in an MFP will be described with reference to FIGS. 15 and 16. FIG. 16 is a flowchart illustrating setting processing implemented by the automatic setting program 300. The setting processing of FIG. 16 is executed at a state where the MFP is activated or where an instruction to obtain a script 1700 is given via the operation unit 208 of the MFP. Steps alike those described above are designated by the same reference numerals. A redundant detailed description thereof will be omitted.

The setting processing of FIG. 16 is executed on the premise that the script 1700 is generated by the client PC 103 and stored in the project management server 120 like the checking script (FIG. 8). The setting script illustrated in FIG. 7A is part of the script 1700 for executing the setting processing illustrated in FIG. 15. The script 1700 describes not only the setting processing for data transmission but procedures for installing an application and firmware as well.

In step S1102, the communication unit 303 of the automatic setting program 300 obtains the script 1700. In step S1602, the automatic setting program 300 analyzes the obtained script 1700.

In step S1603, the processing execution unit 302 of the automatic setting program 300 executes processing based on the analysis of the script 1700. The order of processing is determined by the values of "order" described in the respective commands. In the example of FIG. 15, the processing execution unit 302 executes the commands to perform FW update processing, processing for activating optional functions of the MFP, processing for installing an expansion program, and the processing for setting the transmitted contents illustrated in FIG. 7A.

In step S1104, the processing execution unit 302 transmits the execution result of the setting processing to the project management server 120 via the communication unit 303. The above is the setting processing executed by the MFP.

<Instructions on Setting Processing>

The script 1700 will be described with reference to FIG. 15. The script 1700 includes a command to execute the FW update processing, a command to execute optional function activation processing, a command to execute expansion program installation processing, and a command to execute the setting processing for data transmission.

The command to execute the FW update processing defines the processing with the description of an <updateFirmwareCommand> tag. The <updateFirmwareCommand> tag includes a <dirpath> tag and a <name> tag. The <dirpath> tag specifies a directory path where firmware to be updated is included. The <name> tag specifies a content file for update.

The command to execute the optional function activation processing defines the processing for activating the optional functions previously built into the MFP with the description of an <activateOptionCommand> tag. The <activateOptionCommand> tag includes a <dirpath> tag and a <name> tag. The <dirpath> tag specifies a directory path where a license file for activating the optional functions is included. The <name> tag specifies the license file for activating the optional functions. The optional functions are activated by using a license managed by the project management server 120. While the license file is described to be used for license activation, this is not restrictive. For example, a license key defined by a character string may be specified.

The command to execute the expansion program installation processing defines the processing with the description of an <installApplicationCommand> tag. The <installApplicationCommand> tag includes a <dirpath> tag and two <name> tags. The <dirpath> tag specifies a directory path where an expansion program to be installed is stored in the project management server 120. The <name> tags specify the filename of the application (expansion program) to be installed and a license file. The installation processing of the application is executed by using the application file and a license managed by the project management server 120. By this processing, the processing execution unit 302 executes not only the installation processing of the application but also processing for activating the application, i.e., making the application usable. However, such processes may be performed by respective different processing units as appropriate. The order of processing is determined by the values of "order" described in the respective commands. In the present exemplary embodiment, the script 1700 (instructions) is expressed in XML. However, the script 1700 is not limited to XML and may be written as a shell script.

A second exemplary embodiment will be described. In the second exemplary embodiment, a configuration for enabling a user to use functions other than a data transmission function while the checking script of FIG. 8 is being executed to check the transmission settings will be described. In the following description, components alike those described in the first exemplary embodiment are designated by the same reference numerals. A redundant detailed description thereof will be omitted.

Figure 14:
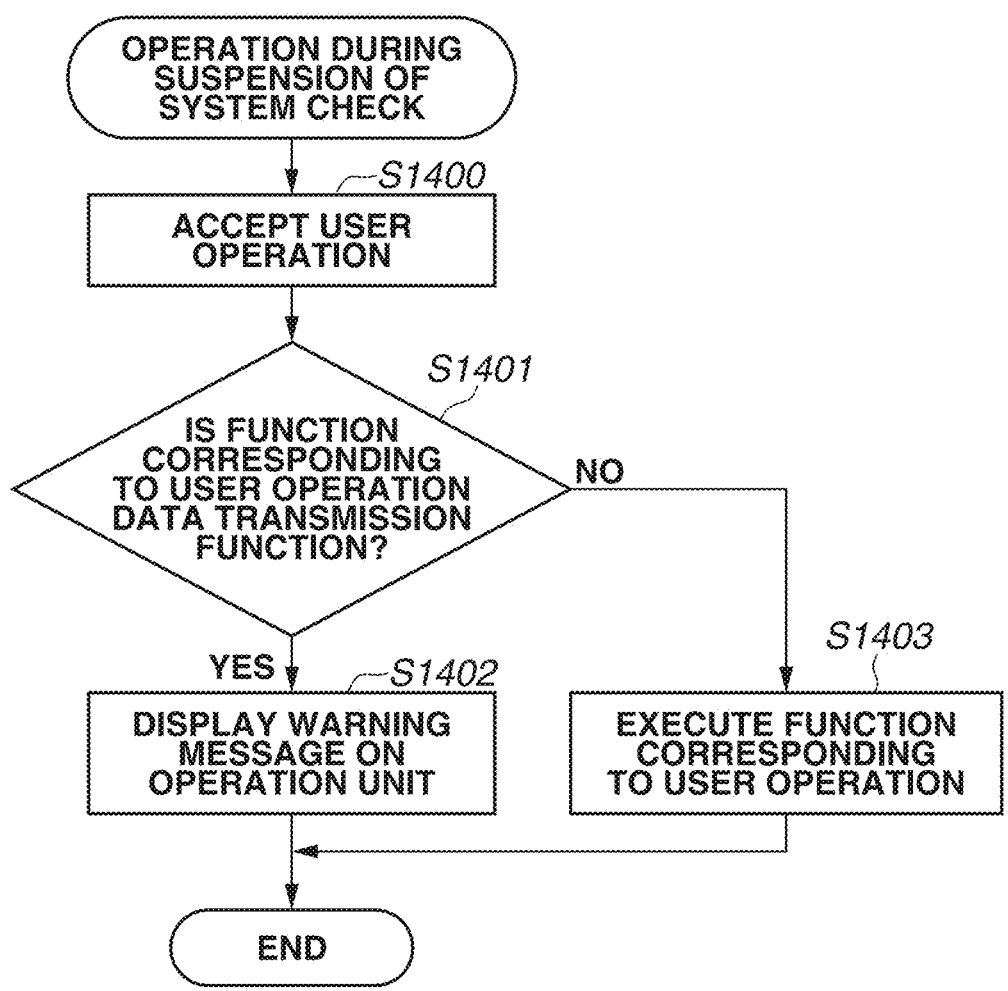
FIG. 14 is a flowchart illustrating operations during suspension of a system check according to a second exemplary embodiment.

FIG. 14 illustrates processing executed while the processing of an MFP is suspended by the execution of the checking script (step S1361). This processing is implemented by the CPU 201 of the MFP executing the automatic setting program 300. The processing is started when triggered by the user selecting a function on the operation unit 208.

In step S1400, the UI control unit 301 accepts a user operation. Examples of the function of the MFP to be selected by the user operation include a copy function, an iFAX function, and a scan function.

In step S1401, the processing execution unit 302 determines whether the function corresponding to the user operation accepted in step S1400 is a data transmission function. For example, in a case where a setting value "iFAX" is set in the setting item "function" (FIG. 7B) as the result of execution of the setting script (FIG. 7A), in step S1401, the processing execution unit 302 determines whether the function selected by the user is the iFAX function.

If, in step S1401, the function selected by the user is determined to be a data transmission function (YES in step S1401), the processing proceeds to step S1402. If the function selected by the user is determined to not be a data transmission function (NO in step S1401), the processing proceeds to step S1403.

In step S1401, the processing execution unit 302 may make the determination not based on whether a data transmission function is selected by the user operation but based on whether the setting contents of the data transmission function selected by the user satisfy a transmission condition. For example, the determination may be made based on whether the user selects the iFAX function and the data to be transmitted satisfies the transmission condition.

In step S1402, the UI control unit 301 displays a warning message that the user-operated function does not function normally on the operation unit 208. The processing ends. In step S1403, the processing execution unit 302 executes the function corresponding to the user operation accepted in step S1400. The processing ends.

In the present procedure, the processing corresponding to the user operation is not executed if the function corresponding to the accepted user operation is a data transmission function. However, the processing may be executed after the display of the warning message in step S1402.

The use of the configuration according to the present exemplary embodiment improves efficiency by making the intended function usable without a wait until the execution of the checking script is completed.

Other Embodiments

In FIGS. 8, 12, and 13, the processing for generating a checking script and the processing for executing the checking script are described on the assumption that the MFP 112 serves as a transmission source (client) and a transmission destination (server) of transmission processing. However, this is not restrictive. For example, the MFP 112 may serve as either a transmission source or a transmission destination. For example, if the MFP 112 is a transmission source and not a transmission destination of transmission processing, the server section 830 is not included in the checking script. The processing of steps S1207 and S1208 in FIG. 12 and steps S1355 and S1356 in FIG. 13 is omitted accordingly.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-048749, filed Mar. 15, 2019, which is hereby incorporated by reference herein in its entirety.

What is claimed is:

1. An information processing system comprising:
a plurality of image processing apparatuses;
a client configured to generate a first script for executing a setting processing on an image processing apparatus; and
a management server configured to manage the first script,
wherein the management server includes:
a generation unit configured to generate, when the management server receives a predetermined request from the image processing apparatus, a second script for executing transmission processing of data from the image processing apparatus to another image processing apparatus, and for transmitting by the image processing apparatus an execution result of the transmission processing to the management server, and
a transmission unit configured to transmit the first and second scripts to the image processing apparatus.

2. The information processing system according to claim 1, wherein the image processing apparatus is configured to, after the setting processing is executed based on the first script, execute the transmission processing based on the second script generated by the generation unit and transmit the execution result of the transmission processing to the management server.

3. The information processing system according to claim 1, wherein the generation unit is configured to, when the management server receives the predetermined request from the image processing apparatus, generate the second script and a table for storing the execution result of the transmission processing executed based on the second script.

4. The information processing system according to claim 1,
wherein the client further includes a display unit configured to display a first display screen for specifying a folder structure to be set in the image processing apparatus and a second display screen for selecting a folder included in the folder structure as a transmission destination in executing the transmission processing, and
wherein the client is configured to generate the first script based on the folder structure specified on the first display screen and the transmission destination selected on the second display screen.

5. The information processing system according to claim 1, wherein the second script includes,
in a case where the image processing apparatus is a transmission source of the transmission processing, first code for checking whether the data is transmittable from the image processing apparatus to a transmission destination, and
in a case where the image processing apparatus is the transmission destination of the transmission processing, second code for checking whether the data is receivable by the image processing apparatus from the transmission source.

6. The information processing system according to claim 5, wherein, in a case where the data is determined to be not transmittable from the image processing apparatus to the transmission destination as a result of execution of the first code or in a case where the image processing apparatus is determined to have not received the data from the transmission source as a result of execution of the second code, an execution result indicating that the transmission processing is not completed is transmitted to the management server.

7. The information processing system according to claim 1, wherein the transmission processing is facsimile transmission processing from the image processing apparatus to another image processing apparatus.

8. The information processing system according to claim 1, wherein the first script includes data for installing an application and/or a firmware to the image processing apparatus.

9. A method for controlling an information processing system including a plurality of image processing apparatuses, a client configured to generate a first script for executing a setting processing on an image processing apparatus, and a management server configured to manage the first script, the method comprising:
   generating, by the management server when the management server receives a predetermined request from the image processing apparatus, a second script for executing transmission processing of data from the image processing apparatus to another image processing apparatus, and for transmitting an execution result of the transmission processing from the image processing apparatus to the management server; and
   transmitting the first and second scripts from the management server to the image processing apparatus.

10. A management server comprising:
   a management unit configured to manage a first script for executing a setting processing on an image processing apparatus;
   a generation unit configured to generate, when the management server receives a predetermined request from the image processing apparatus, a second script for executing transmission processing of data from the image processing apparatus to another image processing apparatus, and for transmitting by the image processing apparatus an execution result of the transmission processing to the management server; and
   a transmission unit configured to transmit the first and second scripts to the image processing apparatus.

11. The management server according to claim 10, wherein the generation unit is configured to, when the management server receives the predetermined request from the image processing apparatus, generate the second script and a table for storing the execution result of the transmission processing executed based on the second script.

12. The management server according to claim 10, wherein the transmission processing is facsimile transmission processing from the image processing apparatus to another image processing apparatus.

13. The management server according to claim 10, wherein the first script includes data for installing an application and/or a firmware to the image processing apparatus.

14. A method for controlling a management server configured to manage for executing a setting processing on an image processing apparatus, the method comprising:
   generating, when the management server receives a predetermined request from the image processing apparatus, a second script for executing transmission processing of data from the image processing apparatus to another image processing apparatus, and for transmitting by the image processing apparatus an execution result of the transmission processing to the management server; and
   transmitting the first and second scripts to the image processing apparatus.

15. A non-transitory storage medium storing instructions to be executed by one or more processors of a management server the manages a first script for executing a setting processing on an image processing apparatus, wherein the instructions causes the one or more processors to perform:
   generating, when the management server receives a predetermined request from the image processing apparatus, a second script for executing transmission processing of data from the image processing apparatus to another image processing apparatus, and for transmitting by the image processing apparatus an execution result of the transmission processing to the management server; and
   transmitting the first and second scripts to the image processing apparatus.

* * * * *